(12) United States Patent
Taggar et al.

(10) Patent No.: US 11,269,861 B2
(45) Date of Patent: Mar. 8, 2022

(54) DATABASE TOOL

(71) Applicant: Bank of America Corporation, Charlotte, NC (US)

(72) Inventors: Sanchit Taggar, New Delhi (IN); Sandeep Kumar Chauhan, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 331 days.

(21) Appl. No.: 16/443,368

(22) Filed: Jun. 17, 2019

(65) Prior Publication Data

US 2020/0394179 A1    Dec. 17, 2020

(51) Int. Cl.
*G06F 16/23* (2019.01)
*G06N 20/00* (2019.01)
*G06F 16/245* (2019.01)

(52) U.S. Cl.
CPC ........ *G06F 16/2379* (2019.01); *G06F 16/245* (2019.01); *G06N 20/00* (2019.01)

(58) Field of Classification Search
CPC .... G06F 16/2379; G06F 16/245; G06N 20/00
USPC ................................................. 707/723, 703
See application file for complete search history.

(56) References Cited

U.S. PATENT DOCUMENTS

| | | |
|---|---|---|
| 4,467,421 A | 8/1984 | White |
| 5,459,853 A | 10/1995 | Best |
| 5,790,774 A | 8/1998 | Sarkozy |
| 5,996,054 A | 11/1999 | Ledain |
| 6,233,648 B1 | 5/2001 | Tomita |
| 6,434,681 B1 | 8/2002 | Armangau |
| 6,697,881 B2 | 2/2004 | Cochran |
| 6,883,063 B2 | 4/2005 | Blumenau |
| 6,883,074 B2 | 4/2005 | Lee |
| 6,938,059 B2 | 8/2005 | Tamer |
| 6,982,939 B2 | 1/2006 | Powelson |
| 7,035,881 B2 | 4/2006 | Tummala et al. |
| 7,035,972 B2 | 4/2006 | Guha |
| 7,046,805 B2 | 5/2006 | Fitzhardinge |
| 7,573,715 B2 | 8/2009 | Mojaver |
| 7,949,636 B2 | 5/2011 | Akidau |
| 7,979,633 B2 | 7/2011 | Kleiman |
| 8,074,011 B2 | 12/2011 | Flynn |
| 8,140,821 B1 | 3/2012 | Raizen |
| 8,346,661 B2 | 1/2013 | Allison, Jr. et al. |
| 8,473,953 B2 | 6/2013 | Bourbonnais et al. |
| 8,706,968 B2 | 4/2014 | Flynn |
| 8,806,160 B2 | 8/2014 | Colgrove |

(Continued)

OTHER PUBLICATIONS

Taggar, S. et al., "Database Tool," U.S. Appl. No. 16/443,229, filed Jun. 17, 2019, 69 pages.
U.S. Appl. No. 16/443,229, filed Jun. 17, 2019, Taggar et al.

*Primary Examiner* — Evan Aspinwall

(57) ABSTRACT

A system includes a database, a memory, and a processor. The database stores a set of transactions, each of which includes a set of fields. The processor receives a query from a user through a channel. The query is directed to a transaction stored in the database. The transaction includes a set of fields. The processor applies a machine learning policy adapted to determine a view, i.e., a subset of the set of fields that the user is likely to access using the channel. The processor further accesses the database and retrieves the view. The processor then sends the view to the channel.

20 Claims, 10 Drawing Sheets

(56) References Cited

U.S. PATENT DOCUMENTS

| | | |
|---|---|---|
| 8,825,937 B2 | 9/2014 | Atkisson |
| 8,843,436 B2 | 9/2014 | Marschall et al. |
| 8,954,710 B2 | 2/2015 | Colgrove |
| 8,984,216 B2 | 3/2015 | Fillingim |
| 9,134,917 B2 | 9/2015 | Kimmel |
| 9,189,421 B2 | 11/2015 | Testardi |
| 9,251,066 B2 | 2/2016 | Colgrove |
| 9,304,853 B2 | 4/2016 | Thatcher |
| 9,436,396 B2 | 9/2016 | Colgrove |
| 9,507,537 B2 | 11/2016 | Wright |
| 9,547,834 B2 | 1/2017 | Nayyar et al. |
| 9,613,122 B2 | 4/2017 | Chao et al. |
| 9,659,077 B2 | 5/2017 | Chen |
| 9,760,874 B2 | 9/2017 | Zaidi et al. |
| 10,013,317 B1 | 7/2018 | Colgrove |
| 10,152,504 B2 | 12/2018 | Heman |
| 10,216,821 B2 | 2/2019 | Cheenath et al. |
| 2017/0004487 A1* | 1/2017 | Hagen .................. G06F 16/215 |
| 2020/0356873 A1* | 11/2020 | Nawrocke ......... G06F 16/24561 |
| 2020/0372016 A1* | 11/2020 | Rogynskyy ......... H04L 67/1095 |

\* cited by examiner

125

| Customer ID | Name | City |
|---|---|---|
| 1 | Aa | New York |
| 2 | Bb | Washington |
| 3 | Cc | Dallas |

⎦ 305

| Account ID | Description |
|---|---|
| 1 | Checking Account |
| 2 | Savings Account |
| 3 | Credit Card |

⎦ 310

| Transaction ID | Customer ID | Account ID | Amount |
|---|---|---|---|
| 1 | 1 | 2 | 300.00 |
| 2 | 1 | 3 | 450.00 |
| 3 | 2 | 1 | 10.50 |
| 4 | 3 | 2 | 1005.00 |

⎦ 315

| Customer ID | Account ID | Opening Date |
|---|---|---|
| 1 | 2 | 10/2/2002 |
| 1 | 3 | 12/4/2004 |
| 2 | 1 | 5/7/1992 |
| 2 | 2 | 5/7/1992 |
| 2 | 3 | 5/7/1992 |
| 3 | 1 | 4/8/2012 |
| 3 | 3 | 11/2/2018 |

| Transaction ID | Customer Name | Account | Amount |
|---|---|---|---|
| 1 | Aa | Savings Account | 300.00 |
| 2 | Aa | Credit Card | 450.00 |
| 3 | Bb | Checking Account | 10.50 |
| 4 | Cc | Savings Account | 1005.00 |

⎦ 325

| Customer Name | City | Account | Opening Date |
|---|---|---|---|
| Aa | New York | Savings Account | 10/2/2002 |
| Aa | New York | Credit Card | 12/4/2004 |
| Bb | Washington | Checking Account | 5/7/1992 |
| Bb | Washington | Savings Account | 5/7/1992 |
| Bb | Washington | Credit Card | 5/7/1992 |
| Cc | Dallas | Checking Account | 4/8/2012 |
| Cc | Dallas | Credit Card | 11/2/2018 |

DATABASE TOOL

TECHNICAL FIELD

This disclosure relates generally to data storage and access.

BACKGROUND

Organizations frequently maintain databases to store large quantities of data in their systems. Often such data is both created and accessed by customers of the organizations.

SUMMARY

Organizations frequently maintain databases to store large quantities of data in their systems. Often such data is both created and accessed by customers of the organizations, who interact with the data storage systems of such organizations on a regular basis. Maintaining customer satisfaction in such situations often depends on an organization's ability to efficiently process any customer requests it receives—both those requests seeking to write data to the organization's system, as well as those requests seeking to read data stored in the system. Unfortunately, there is a performance trade-off in conventional database systems with respect to read and write operations, given that a single database cannot be both read-efficient and write-efficient at the same time. As an example, a write-efficient database might employ a normalized database model, such that each write operation performed on the database writes a given piece of data to a minimal number of locations in the database. However, this situation tends to result in a database that stores a large number of separate tables. Consequently, read operations performed on the database typically require multiple table joins, which may be highly resource intensive. On the other hand, in order to avoid the need for multiple table joins when reading data, a read-efficient database may store large amounts of redundant data. However, writing data to multiple locations within a database to help ensure that the database is read-efficient consumes substantial resources.

This disclosure contemplates an unconventional database tool that addresses one or more of the above issues. The database tool enables the operation of a database system that is both read and write efficient, in part by maintaining the same data in both a write-efficient database as well as a read-efficient database. To store data in the write-efficient database, the database tool assigns each processor of a set of processors to a different transaction type, as well as to a different segment of the write-efficient database. In this manner, all of the processors of the set of processors are able to process transaction requests (including writing to the write-efficient database) simultaneously. After a processor has finished writing a piece of data in the write-efficient database, it stores a command to write the same data in the read-efficient database in a queue. A separate processor monitors the queue and executes commands that are stored in the queue. In this manner, writing to the read-efficient database does not negatively impact the performance of the processor in handling transaction requests directed towards write operations.

To read data from the read-efficient database, the database tool implements a machine learning algorithm which associates different views of the transactions stored in the database with the various channels used by users to send and receive queries related to those transactions. For example, the database tool may use the machine learning algorithm to determine that a user who uses a mobile phone to send a query and receive a response related to a payment transaction stored in the database is likely to view the payment amount and the payment destination fields of the response, using the device. Therefore, the tool may read the payment amount and the payment destination from the database and send those fields to the user device, rather than reading and sending the entire set of fields associated with the transaction to the device. In this manner, the tool further reduces the processor resources required to read data from the read-efficient database. Certain embodiments of the database tool are described below.

According to one embodiment, a system includes a database, a memory, and a hardware processor communicatively coupled to the memory. The database stores a set of transactions. Each transaction of the set of transactions includes a set of fields. The memory stores a set of training data. The hardware processor determines that a threshold number of queries have not been received. In response to determining that the threshold number of queries have not been received, the processor receives a first query from a first channel. The first query is directed to a first transaction stored in the database. The first transaction includes a first set of fields. The processor further accesses the database and retrieves the first set of fields. The processor also sends the first set of fields to the first channel. The processor further determines that a user used the first channel to access a first view of the first set of fields. The first view includes a first subset of the first set of fields. The processor additionally adds the first view and the first channel to the training data. The processor further uses the training data to determine a machine learning policy, such that for a given channel and a requested transaction including a second set of fields stored in the database, the machine learning policy can be used to determine a second view including a second subset of the second set of fields. Here, determining the second view includes determining that a confidence level that the given channel will access the second view is greater than a given threshold. The processor additionally determines that the threshold number of queries has been received. In response to determining that the threshold number of queries has been received, the processor receives a second query from a third channel. The second query is directed to a second transaction stored in the database. The second transaction includes a third set of fields. The processor also applies the machine learning policy to determine a third view including a third subset of the third set of fields. The processor further accesses the database and retrieves the third view. The processor then sends the third view to the third channel.

According to another embodiment, a method includes determining that a threshold number of queries have not been received. In response to determining that the threshold number of queries have not been received, the method also includes receiving a first query from a first channel. The first query is directed to a first transaction stored in a database. The first transaction includes a first set of fields. The method further includes accessing the database and retrieving the first set of fields. The method additionally includes sending the first set of fields to the first channel. The method also includes determining that a user used the first channel to access a first view of the first set of fields. The first view includes a first subset of the first set of fields. The method further includes adding the first view and the first channel to the training data. The method additionally includes using the training data to determine a machine learning policy, such that for a given channel and a requested transaction comprising a second set of fields stored in the database, the machine learning policy can be used to determine a second view including a second subset of the second set of fields. Here, determining the second view includes determining that a confidence level that the given channel will access the second view is greater than a given threshold. The method further includes determining that the threshold number of queries has been received. In response to determining that the threshold number of queries has been received, the method includes receiving a second query from a third channel. The second query is directed to a second transaction stored in the database. The second transaction includes a third set of fields. The method also includes applying the machine learning policy to determine a third view including a third subset of the third set of fields. The method additionally includes accessing the database and retrieve the third view. In response to accessing the database and retrieving the third view, the method further includes sending the third view to the third channel.

According to another embodiment, a system includes a first storage element, a second storage element, and a processing element communicatively coupled to the second storage element. The first storage element is operable to store a set of transactions. Each transaction of the set of transactions includes a set of fields. The second storage element is operable to store a set of training data. The processing element is operable to determine that a threshold number of queries have not been received. In response to determining that the threshold number of queries have not been received, the processing element is operable to receive a first query from a first channel. The first query is directed to a first transaction stored in the first storage element. The first transaction includes a first set of fields. The first channel represents a first user system used to access the first storage element. The processing element is further operable to access the first storage element and retrieve the first set of fields. The processing element is also operable to send the first set of fields to the first channel. The processing element is additionally operable to determine that a user used the first channel to access a first view of the first set of fields. The first view includes a first subset of the first set of fields. The processing element is further operable to add the first view and the first channel to the training data. The processing element is additionally operable to use the training data to determine a machine learning policy, such that for a given channel and a requested transaction comprising a second set of fields stored in the first storage element, the machine learning policy can be used to determine a second view comprising a second subset of the second set of fields. Here, determining the second view includes determining that a confidence level that the given channel will access the second view is greater than a given threshold. The processing element is also operable to determine that the threshold number of queries has been received. In response to determining that the threshold number of queries has been received, the processing element is operable to receive a second query from a third channel. The second query is directed to a second transaction stored in the first storage element. The second transaction includes a third set of fields. The third channel represents a second user system used to access the first storage element. The second user system is different from the first user system. The processing element is further operable to apply the machine learning policy to determine a third view including a third subset of the third set of fields. The processing element is additionally operable to access the first storage element and retrieve the third view. In response to accessing the first storage element and retrieving the third view, the processing element is operable to send the third view to the third channel.

According to another embodiment, a system includes a first database, a second database, a first hardware processor, a second hardware processor, a third hardware processor, and a fourth hardware processor. The first database includes a first segment assigned to a first transaction type and a second segment assigned to a second transaction type. The first hardware processor is assigned to the first transaction type. The first processor receives a first request from a third hardware processor to store a first piece of data in the first database. The first request is assigned to the first transaction type. The first processor then writes the first piece of data into the first segment of the first database. In response to writing the first piece of data into the first segment, the first processor further stores a first command to write the first piece of data into the second database in a first queue. The first queue includes a first series of commands. The second hardware processor is assigned to the second transaction type. The second processor receives a second request from the third processor to store a second piece of data in the first database. The second request is assigned to the second transaction type. The second processor then writes the second piece of data into the second segment of the first database. In response to writing the second piece of data into the second segment, the second processor stores a second command to write the second piece of data into the second database in a second queue. The second queue includes a second series of commands. The third hardware processor receives a third request from a user to store a third piece of data. In response to receiving the third request, the third processor determines that the third request is assigned to the first transaction type. In response to determining that the third request is assigned to the first transaction type, the third processor sends the third request to the first processor, assigned to the first transaction type. The third processor also receives a fourth request from the user to store a fourth piece of data. In response to receiving the fourth request, the third processor determine that the fourth request is assigned to the second transaction type. In response to determining that the fourth request is assigned to the second transaction type, the third processor sends the fourth request to the second processor, assigned to the second transaction type. The third processor additionally receives a fifth request from the user to retrieve a fifth piece of data. In response to receiving the fifth request, the third processor reads the fifth piece of data from the second database and sends the fifth piece of data to the user. The fourth processor accesses the first queue. In response to accessing the first queue, the fourth processor executes the first series of commands stored in the first queue. Executing the first series of commands stored in the first queue includes writing the first piece of data into one or more locations in the second database. The fourth processor further accesses the second queue. In response to accessing the second queue, the fourth processor executes the second series of commands stored in the second queue. Executing the second series of commands stored in the second queue includes writing the second piece of data into one or more locations in the second database.

According to yet another embodiment, a method includes receiving a first request from a user to store a first piece of data in a system. The system includes a first database and a second database. The first database includes a first segment assigned to a first transaction type and a second segment assigned to a second transaction type. In response to receiving the first request, the method includes determining that the first request is assigned to the first transaction type. In response to determining that the first request is assigned to the first transaction type, the method includes sending the first request to a first hardware processor. The first hardware processor is assigned to the first transaction type. The first processor receives the first request to store the first piece of data in the first database. The first processor also writes the first piece of data into the first segment of the first database. In response to writing the first piece of data into the first segment, the first processor stores a first command to write the first piece of data into the second database in a first queue. The first queue includes a first series of commands. Here, a fourth processor accesses the first queue. In response to accessing the first queue, the fourth processor executes the first series of commands stored in the first queue. Executing the first series of commands stored in the first queue includes writing the first piece of data into one or more locations in the second database. The method additionally includes receiving a second request from the user to store a second piece of data in the system. In response to receiving the second request, the method includes determining that the second request is assigned to the second transaction type. In response to determining that the second request is assigned to the second transaction type, the method includes sending the second request to a second processor assigned to the second transaction type. The second processor receives the second request to store the second piece of data in the first database. The second processor also writes the second piece of data into the second segment of the first database. In response to writing the second piece of data into the second segment, the second processor stores a second command to write the second piece of data into the second database in a second queue. The second queue includes a second series of commands. Here, the fourth processor accesses the second queue. In response to accessing the second queue, the fourth processor executes the second series of commands stored in the second queue. Executing the second series of commands stored in the second queue includes writing the second piece of data into one or more locations in the second database. The method further includes receiving a third request from the user to retrieve a third piece of data. In response to receiving the third request, the method includes reading the third piece of data from the second database and sending the third piece of data to the user.

According to a further embodiment, a system includes a first storage element, a second storage element, a first processing element, a second processing element, a third processing element, and a fourth processing element. The first storage element includes a first segment assigned to a first transaction type and a second segment assigned to a second transaction type. The first processing element is assigned to the first transaction type. The first processing element is operable to receive a first request from a third processing element to store a first piece of data in the first storage element. The first request is assigned to the first transaction type. The first processing element is then operable to write the first piece of data into the first segment of the first storage element. In response to writing the first piece of data into the first segment, the first processing element is operable to store a first command to write the first piece of data into the second storage element in a first queue. The first queue includes a first series of commands. The second processing element is assigned to the second transaction type. The second processing element is operable to receive a second request from the third processing element to store a second piece of data in the first storage element. The second request is assigned to the second transaction type. The second processing element is then operable to write the second piece of data into the second segment of the first storage element. In response to writing the second piece of data into the second segment, the second processing element is operable to store a second command to write the second piece of data into the second storage element in a second queue. The second queue includes a second series of commands. The third processing element is operable to receive a third request from a user to store a third piece of data. In response to receiving the third request, the third processing element is operable to determine that the third request is assigned to the first transaction type. In response to determining that the third request is assigned to the first transaction type, the third processing element is operable to send the third request to the first processing element assigned to the first transaction type. The third processing element is further operable to receive a fourth request from the user to store a fourth piece of data. In response to receiving the fourth request, the third processing element is operable to determine that the fourth request is assigned to the second transaction type. In response to determining that the fourth request is assigned to the second transaction type, the third processing element is operable to send the fourth request to the second processing element, assigned to the second transaction type. The third processing element is further operable to receive a fifth request from the user to retrieve a fifth piece of data. In response to receiving the fifth request, the third processing element is operable to read the fifth piece of data from the second storage element and send the fifth piece of data to the user. The fourth processing element is operable to access the first queue. In response to accessing the first queue, the fourth processing element is operable to execute the first series of commands stored in the first queue. Executing the first series of commands stored in the first queue includes writing the first piece of data into one or more locations in the second database. The fourth processing element is also operable to access the second queue. In response to accessing the second queue, the fourth processing element is operable to execute the second series of commands stored in the second queue. Executing the second series of commands stored in the second queue includes writing the second piece of data into one or more locations in the second database. The fourth processing element is additionally operable to compare the first storage element to the second storage element at a scheduled time each day. The fourth processing element is further operable to determine that a sixth piece of data stored in the first storage element is not stored in the second storage element. In response to determining that the sixth piece of data stored in the first storage element is not stored in the second storage element, the fourth processing element is operable to copy the sixth piece of data from the first storage element and write the sixth piece of data into one or more third locations in the second storage element.

Certain embodiments provide one or more technical advantages. For example, an embodiment provides a data storage system that is both read efficient and write efficient. As another example, an embodiment conserves system resources by responding to database queries received from various user devices with only those fields of data that the users of the devices are likely to access. As another example, an embodiment reduces the chances for data inconsistencies to develop in a data storage system. As a further example, an embodiment enables a large number of users to both request data to be written to a system and request data to be retrieved from the system without encountering processor bottlenecks in responding to the requests. Certain embodiments may include none, some, or all of the above technical advantages.

One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which:

FIGS. 3A and 3B present examples illustrating differences between an example data storage format used in a write-efficient database and an example data storage format used in a read-efficient database;

DETAILED DESCRIPTION

Figure 1:
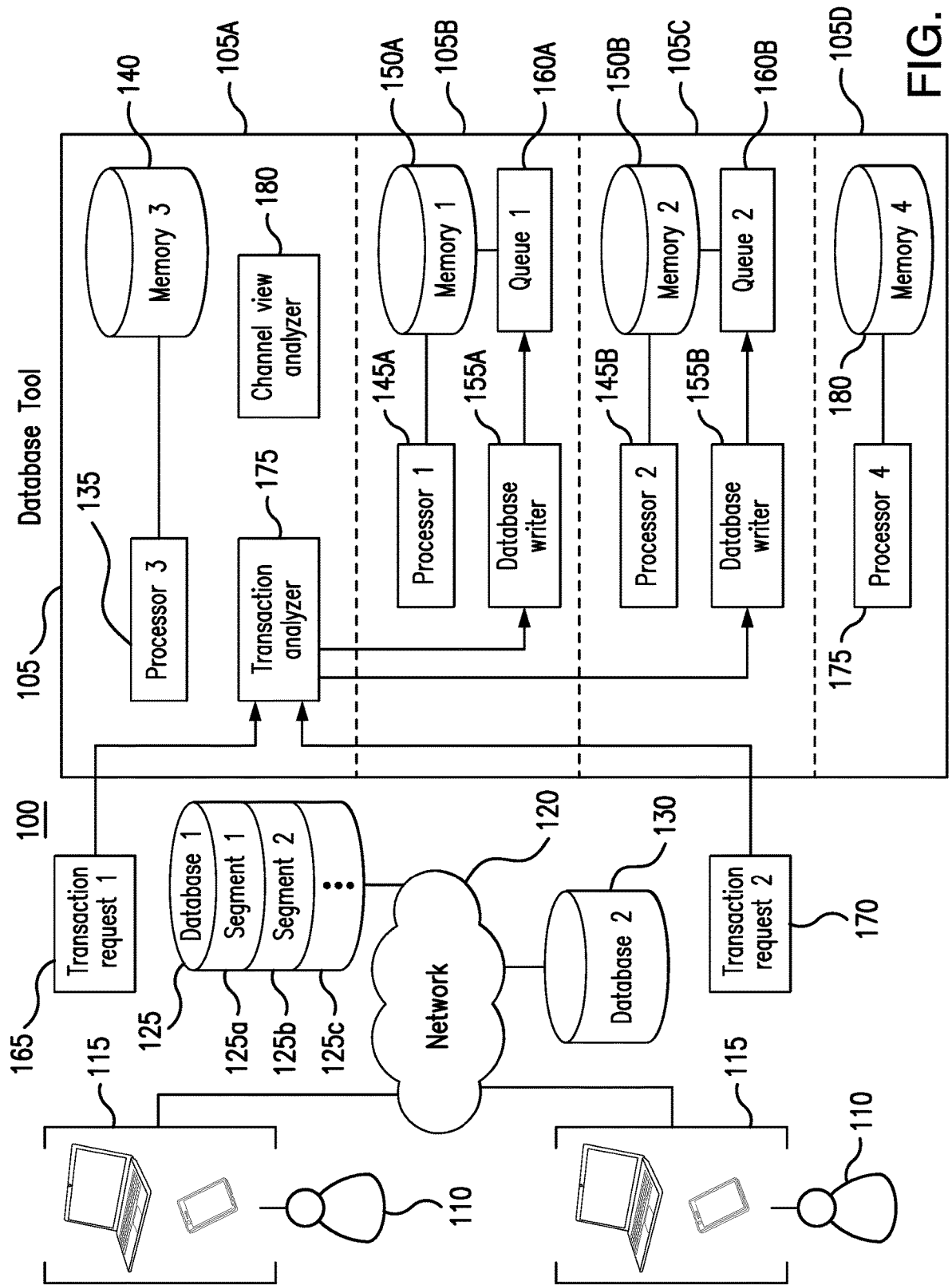
FIG. 1 illustrates an example system.

Embodiments of the present disclosure and its advantages are best understood by referring to FIGS. 1 through 11 of the drawings, like numerals being used for like and corresponding parts of the various drawings.

Organizations frequently maintain databases to store large quantities of data in their systems. Often such data is both created and accessed by customers of the organizations, who interact with the data storage systems of such organizations on a regular basis. Maintaining customer satisfaction in such situations often depends on an organization's ability to efficiently process any customer requests it receives—both those requests seeking to write data to the organization's system, as well as those requests seeking to read data stored in the system. Unfortunately, there is a performance trade-off in conventional database systems with respect to read and write operations, given that a single database cannot be both read-efficient and write-efficient at the same time. As an example, a write-efficient database might employ a normalized database model, such that each write operation performed on the database writes a given piece of data to a minimal number of locations in the database. However, this situation tends to result in a database that stores a large number of separate tables. Consequently, read operations performed on the database typically require multiple table joins, which may be highly resource intensive. On the other hand, in order to avoid the need for multiple table joins when reading data, a read-efficient database may store large amounts of redundant data. However, writing data to multiple locations within a database to help ensure that the database is read-efficient consumes substantial resources.

This disclosure contemplates an unconventional database tool that addresses one or more of the above issues. The database tool enables the operation of a database system that is both read and write efficient, in part by maintaining the same data in both a write-efficient database as well as a read-efficient database. To store data in the write-efficient database, the database tool assigns each processor of a set of processors to a different transaction type, as well as to a different segment of the write-efficient database. In this manner, all of the processors of the set of processors are able to process transaction requests (including writing to the write-efficient database) simultaneously. After a processor has finished writing a piece of data in the write-efficient database, it stores a command to write the same data in the read-efficient database in a queue. A separate processor monitors the queue and executes commands that are stored in the queue. In this manner, writing to the read-efficient database does not negatively impact the performance of the processor in handling transaction requests directed towards write operations.

To read data from the read-efficient database, the database tool implements a machine learning algorithm which associates different views of the transactions stored in the database with the various channels used by users to send and receive queries related to those transactions. For example, the database tool may use the machine learning algorithm to determine that a user who uses a cellphone to send a query and receive a response related to a payment transaction stored in the database is likely to view the payment amount and the payment destination fields of the response, using the device. Therefore, the tool may read the payment amount and the payment destination from the database and send these fields to the user device, rather than reading and sending the entire set of fields associated with the transaction to the device. In this manner, the tool further reduces the processor resources required to read data from the read-efficient database. The database tool will be described in more detail using FIGS. 1 through 11.

FIGS. 1 through 7 focus on the operation of the database tool in response to receiving a request from a user to write data to the system, while FIGS. 8 through 11 focus on the operation of the database tool in response to receiving a request from a user to read data from the system.

FIG. 1 illustrates an example system 100. As seen in FIG. 1, system 100 includes database tool 105, one or more devices 115, network 120, first database 125, and second database 130. This disclosure contemplates that first database 125 is a write-efficient database, such that it takes less time for a processor to write a piece of data into database 125 than it takes for the processor to read the same piece of data from database 125, while second database 130 is a read-efficient database, such that it takes more time for a processor to write a piece of data to second database 130 than it takes for the processor to read the piece of data from second database 130.

Generally, in the context of storing data in system 100, database tool 105 receives transaction requests 165 and 170 from users 110, seeking to store data related to a particular transaction in the system. In response, database tool 105 writes the data into write-efficient first database 125. Database tool 105 then additionally writes the data that has been written into first database 125 into second database 130, using a different processor than the one used to write the data into the write-efficient first database 125. Second database 130 is a read-efficient database to which queries, received by database tool 105 from users 110, can be directed, as discussed in further detail below, in the discussion of FIGS. 8 through 11. In this manner, database tool 105 enables users 110 to interact with a database system that is both read efficient and write efficient.

Devices 115 are used by users 110 to send transaction requests 165 and 170 to database tool 105. Devices 115 are also used by users 110 to send queries to database tool 105 and to receive responses back from database tool 105. This latter aspect of system 100 is described in further detail below, in the discussion of FIG. 8. In certain embodiments, devices 115 may communicate with database tool 105 through network 120 via a web interface.

Devices 115 include any appropriate device for communicating with components of system 100 over network 120. For example, devices 115 may be a telephone, a mobile phone, a computer, a laptop, a tablet, a server and/or an automated assistant. This disclosure contemplates devices 115 being any appropriate device for sending and receiving communications over network 120. As an example, and not by way of limitation, device 115 may be a computer, a laptop, a wireless or cellular telephone, an electronic notebook, a personal digital assistant, a tablet, or any other device capable of receiving, processing, storing, and/or communicating information with other components of system 100. Device 115 may also include a user interface, such as a display, a microphone, keypad, or other appropriate terminal equipment usable by user 110. In some embodiments, an application executed by device 115 may perform the functions described herein.

Network 120 facilitates communication between and amongst the various components of system 100. This disclosure contemplates network 120 being any suitable network operable to facilitate communication between the components of system 100. Network 120 may include any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

First database 125 is a write-efficient database. First database 125 is composed of a set of segments 125a through 125c. This disclosure contemplates that first database 125 may be composed of any number of segments. Each segment of first database 125 is assigned to a different transaction type, such that only data associated with those transaction requests 165 and 170 that are assigned to the same transaction type as a given segment of first database 125 is written in that segment of first database 125. For example, data associated with a first transaction type is written to first segment 125a of first database 125, while data associated with a second transaction type is written to second segment 125b of first database 125. Each segment of first database 125 is additionally assigned to a different processor. For example, in certain embodiments, first processor 145A is assigned to first segment 125a. Accordingly, first processor 145A processes transaction requests 165 and 170 that are assigned to a first transaction type and writes data associated with the transaction requests in first segment 125a. As another example, in certain embodiments, second processor 145B is assigned to second segment 125b. Accordingly, second processor 145B processes transaction requests 165 and 170 that are assigned to a second transaction type and writes data associated with the requests in second segment 125b.

Assigning a different processor to each transaction type helps to ensure that database tool 105 is able to efficiently process each transaction request it receives, without overloading the processing capacity of the tool. For example, in the extreme, if each possible transaction request that database tool 105 might receive were assigned to its own processor, then database tool 105 could receive and simultaneously process any number of transaction requests without overloading database tool 105. Assigning each processor to its own segment of first database 125 helps to facilitate the sharing of processing responsibilities among the processors of database tool 105, by helping to ensure that these processors do not interfere with one another when they are writing to first database 125. For example, if first processor 145A were not assigned to a first segment 125a of first database 125, different from a second segment 125b of first database 125, assigned to second processor 145B, then if first processor 145A were processing transaction request 165 at the same time as second processor 145B was processing transaction request 170, it is possible that first processor 145A and second processor 145B might attempt to write to the same location in first database 125, thereby corrupting the data stored in first database 125.

In certain embodiments, write-efficient first database 125 is a normalized database, with a data storage format chosen to minimize duplicate data entries in the database, compared to an unnormalized database. In certain embodiments, minimizing the total number of entries that a processor writes into first database 125 improves the write-performance of system 100. In certain embodiments, minimizing the total number of entries that a processor writes into first database 125 additionally improves the data integrity of system 100, given that updating a piece of data stored in first database 125 simply involves updating a minimal number of entries in first database 125 (for example, a single entry), thereby limiting the opportunity for errors to be introduced into first database 125. In contrast, updating a piece of data stored in a non-write-efficient database may require updates to numerous entries in the database; failing to update any of such entries will likely lead to data inconsistencies in the system.

As an example of a normalized first database 125, in certain embodiments, each time first processor 145A or second processor 145B stores a piece of data in first database 125, the processor writes the piece of data to a single location in first database 125. As another example, in certain embodiments, first database 125 may be a database of the first normal form (1NF), the second normal form (2NF), the third normal form (3NF), the elementary key normal form (EKNF), the Boyce-Codd normal form (BCNF), the fourth normal form (4NF), the essential tuple normal form (ETNF), the fifth normal form (5NF), the domain-key normal form (DKNF), or the sixth normal form (6NF).

Second database 130 is a read efficient database. In certain embodiments, second database 130 stores the same data as first database 125, but in a storage format that minimizes the number of database table joins a processor performs when retrieving a given piece of data from the database. For example, in certain embodiments, second database 130 is an unnormalized database, which contains additional, redundant entries, compared to first database 125. In certain embodiments, second database 130 is a denormalized database, formed by denormalizing the normalized components of first database 125. In certain embodiments, the use of redundant entries improves the read-performance of system 100, by storing all of the data relevant to any given database query in a single location in the database, thereby decreasing the amount of time required for a processor to retrieve the data from the database.

In certain embodiments, after first processor 145A has written a piece of data into first database 125, first processor 145A stores a command to write the piece of data into one or more locations in second database 130 in a first queue 160A. Additionally, after second processor 145B has written a piece of data into first database 125, second processor 145B stores a command to write the piece of data into one or more locations in second database 130 in a second queue 160B. Then, one or more fourth processors 175 execute the commands stored in first queue 160A and second queue 160B, thereby writing the pieces of data into read-efficient second database 130. In certain embodiments, each of first queue 160A and second queue 160B is assigned its own fourth processor 175. In other embodiments, any number of one or more fourth processors 175 share the role of accessing first queue 160A and second queue 160B and executing the commands stored in the queues. Using separate fourth processors 175 to execute the commands stored in first queue 160A and second queue 160B may be desirable to help ensure that there is limited delay in replicating data from first database 125 into second database 130. This may be desirable for those users 110 who wish to view the results of their transaction requests 165 and 170 very shortly after they submit the transaction requests to database tool 105.

In certain other embodiments, after first processor 145A has written a piece of data into first database 125, first processor 145A additionally writes the piece of data into one or more locations in second database 130. Additionally, after second processor 145B has written a piece of data into first database 125, second processor 145B additionally writes the piece of data into one or more locations in second database 130. In certain such embodiments, in order to conserve processing resources, first processor 145A and second processor 145B do not write data into second database 130 immediately after writing the data into first database 125. Instead, first processor 145A and second processor 145B store commands to write the data into second database 130 in queues 160A and 160B, respectively. These commands are stored in queues 160A and 160B until the available processing capacities of first processor 145A and second processor 145B, respectively, are high enough to write the data into second database 130 without compromising the performance of first processor 145A and second processor 145B in responding to transaction requests 165 and 170 to write data to first database 125. For example, in certain embodiments, once first processor 145A determines that its available processing capacity is above a first threshold, first processor 145A executes the commands stored in first queue 160A. This may include executing one or more commands to write a piece of data into second database 130. In certain embodiments, first processor 145A continually monitors its available processing capacity while it is executing the commands stored in first queue 160A. If first processor 145A determines that its available processing capacity is no longer above a second threshold, first processor 145A stops executing the commands stored in first queue 160A. In certain embodiments, the value of the first threshold is equal to the value of the second threshold. In certain embodiments, the values of the first and second thresholds are set by a system administrator. This disclosure contemplates that second processor 145B (and any number of other processors assigned to given transaction types) behaves in a similar manner to first processor 145A. Using first processor 145A and second processor 145B to write both the write-efficient first database 125 and read-efficient second database 130 may be desirable in situations in which the number of available processors for use in system 100 is limited, and/or it is not expected that users 110 will wish to view the results of their transaction requests 165 and 170 soon after they submit the transaction requests to database tool 105.

If the commands stored in first queue 160A and second queue 160B are timely executed, second database 130 will contain the same data as that stored in first database 125; the differences between first database 125 and second database 130 will merely be in the formats according to which the data is stored. A detailed description of example differences between the storage formats used by first database 125 and second database 130 is present below, in the discussion of FIG. 3.

As seen in FIG. 1, database tool 105 can be split into four or more components 105A through 105D, each containing a processor and a memory, and each associated with a set of specific functions. For example, first component 105A of database tool 105 contains third processor 135 and third memory 140. This disclosure contemplates third processor 135 and third memory 140 being configured to perform any of the functions of the first component 105A of database tool 105 described herein. Generally, first component 105A of database tool 105 implements transaction analyzer 175 and channel view analyzer 180. Additionally, first component 105A of database tool 105 implements a machine learning trainer as described below, in the discussion of FIG. 8. Second component 105B of database tool 105 also contains a first processor 145A and first memory 150A. This disclosure contemplates first processor 145A and first memory 150A being configured to perform any of the functions of the second component 105B of database tool 105 described herein. Generally, second component 105B of database tool 105 implements database writer 155A. Third component 105C of database tool 105 also contains second processor 145B and second memory 150B. This disclosure contemplates second processor 145B and second memory 150B being configured to perform any of the functions of the third component 105C of database tool 105 described herein. Generally, third component 105C of database tool 105 implements database writer 155B. In addition to second component 105B and third component 105C, this disclosure contemplates that as many additional components may be included in database tool 105 as there are additional transaction types, with each additional component containing a processor and a memory, the processor and the memory being configured to implement an additional database writer. Finally, fourth component 105D of database tool 105 contains one or more fourth processors 175 and one or more fourth memories 180. This disclosure contemplates fourth processors 175 and fourth memories 180 being configured to perform any of the functions of the fourth component 105D of database tool 105 described herein. Generally, fourth component 105D executes the commands stored in first queue 160A and second queue 160B, as described above.

Transaction analyzer 175 receives transaction requests 165 and 170 from users 110. For a given transaction request 165 or 170, transaction analyzer 175 determines the type of transaction that the transaction request represents. For example, transaction analyzer 175 may determine that transaction request 165 represents a first transaction type, while transaction request 170 represents a second transaction type. This disclosure contemplates that a transaction request 165 or 170 is any request from a user 110 that involves storing data in system 100. For example, in the financial industry, a transaction request may include a request to update personal information, such as a name, address, or telephone number, a request to transfer money between accounts, a request to make a payment using an account, or any other type of potential financial transaction request. This disclosure contemplates that all of the potential transaction requests 165 and 170 that transaction analyzer 175 may receive may be grouped into a set of different transaction types. For example, in the financial industry, the transaction requests may be grouped into transaction types that may include personal information transactions, checking account transactions, loan transactions, savings account transactions, investment transactions, payment transactions, billing transactions and/or any other potential financial transaction type. This disclosure contemplates that each transaction type of the set of possible transaction types is assigned to both a processor 145A or 145B of database tool 105 and a segment 125a or 125b of first database 125. Accordingly, in response to determining that transaction request 165 represents a first transaction type, transaction analyzer 175 sends transaction request 165 to second component 105B of database tool 105, assigned to first processor 145A, to process transaction request 165 and write data associated with transaction request 165 into first segment 125a of first database 125. In response to determining that transaction request 170 represents a second transaction type, transaction analyzer 175 sends transaction request 170 to third component 105C of database tool 105, assigned to second processor 145B, to process transaction request 170 and write data associated with transaction request 170 into second segment 125b of first database 125.

Transaction analyzer 175 additionally receives queries from users 110 directed to information stored in databases 125 and 130 of system 100. Transaction analyzer 175 determines that these queries represent requests from users 110 to receive information stored in databases 125 and 130 and, in response, transaction analyzer 175 sends these queries to channel view analyzer 180 for further processing. This aspect of database tool 105 will be described in further detail below, in the discussion of FIG. 8.

Transaction analyzer 175 may be a software module stored in memory 140 and executed by third processor 135. An example algorithm for transaction analyzer 175 is as follows: receive transaction request 165 from first user 110; determine if transaction request 165 represents a first transaction type assigned to first processor 145A; if transaction request 165 represents the first transaction type assigned to first processor 145A, send transaction request 165 to second component 105B of database tool 105, assigned to first processor 145A; determine if transaction request 165 represents a second transaction type assigned to second processor 145B; if transaction request 165 represents the second transaction type assigned to second processor 145B, send transaction request 165 to third component 105C of database tool 105, assigned to second processor 145B; determine if transaction request 165 is a query directed to information stored in databases 125 and 130; if transaction request 165 is a query directed to information stored in databases 125 and 130, send the query to channel view analyzer 180 for further processing.

Channel view analyzer 180 receives queries from users 110, directed to transaction information stored in databases 125 and 130. This disclosure contemplates that each transaction stored in databases 125 and 130 is composed of a set of fields. Channel view analyzer 180 accesses second database 130, reads those fields of data that channel view analyzer 180 has determined user 110 is most likely to access using device 115, and sends these fields to user device 115. A detailed description of the operations performed by channel view analyzer 180, including an example algorithm for channel view analyzer 180, is presented below, in the discussion of FIGS. 8 through 11.

Database writers 155A and 155B receive transaction requests from transaction analyzer 175. For example, database writer 155A may receive transaction request 165, representing a first transaction type, while database writer 155B may receive transaction request 170, representing a second transaction type. Database writers 155A and 155B each process their respective transaction requests, determining data associated with each request that is to be stored in the system. Each database writer is assigned to a different segment of first database 125. For example, database writer 155A may be assigned to first segment 125a, while database writer 155B may be assigned to second segment 125b. After database writer 155A determines data associated with transaction request 165 to store in system 100, database writer 155A then writes this data into first segment 125a of first database 125. Additionally, after database writer 155B determines data associated with transaction request 170 to store in system 100, database writer 155B then writes this data into second segment 125b of first database 125.

Assigning each of first processor 145A and second processor 145B to a different transaction type helps to ensure that database tool 105 is able to efficiently process each transaction request 165 and 170 that it receives, without overloading the processing capacity of the tool. For example, in the extreme, if each possible transaction request that database tool 105 might receive were assigned to its own processor, then database tool 105 could receive and simultaneously process any number of transaction requests without overloading database tool 105. Assigning each of first processor 145A and second processor 145B to its own segment of first database 125 helps to facilitate the sharing of processing responsibilities among first processor 145A and second processor 145B, by helping to ensure that these processors do not interfere with one another when they are writing data to first database 125. For example, if first processor 145A were not assigned to a first segment 125a of first database 125 different from a second segment 125b of first database 125, assigned to second processor 145B, then if first processor 145A were processing transaction request 165 at the same time as second processor 145B was processing transaction request 170, it is possible that database writer 155A and database writer 155B might attempt to write to the same location in first database 125, thereby corrupting the data stored in first database 125.

After database writer 155A has written data associated with transaction request 165 into first segment 125a of first database 125, database writer 155A next stores a command in first queue 160A to additionally write this same data into second database 130. Similarly, after database writer 155B has written data associated with transaction request 170 into second segment 125b of first database 125, database writer 155B next stores a command in second queue 160B to additionally write this same data into second database 130. Database writers 155A and 155B store these commands in first queue 160A and second queue 160B, respectively, rather than writing the data into second database 130, in order to conserve the processing resources of first processor 145A and second processor 145B. As described above, second database 130 is a read-efficient database, rather than a write-efficient database. Accordingly, it may take significantly longer to write a piece of data to second database 130 than it takes to write that same piece of data to first database 125. Writing data into second database 130 may therefore tie up needed processing resources. By storing the command to write the data into second database 130 in first queue 160A and second queue 160B, which can then be executed by fourth processors 175 that may have dedicated processing resources for writing to second database 130, database writers 155A and 155B help to ensure that processing capacity is available to handle additional transaction requests they receive.

In certain embodiments, rather than implementing separate, dedicated processors 175 to execute the commands stored in first queue 160A and second queue 160B, first processor 145A and second processor 145B may additionally execute the commands stored in first queue 160A and second queue 160B, respectively, when they have available processing resources to perform such functions. This may be desirable in situations in which the number of available processors for use in system 100 is limited, and/or it is not expected that users 110 will wish to view the results of their transaction requests 165 and 170 soon after they submit the transaction requests, such that a delay in replication of data from first database 125 to second database 130 will likely not negatively impact the experience of user 110 when interacting with database tool 105. In such embodiments, database writer 155A additionally monitors the available processing capacity of first processor 145A. If database writer 155A determines that the available processing capacity of first processor 145A is above a first threshold, database writer 155A executes the commands stored in first queue 160A. This may include executing one or more commands to write a piece of data into second database 130. In certain embodiments, database writer 155A continually monitors the available processing capacity of first processor 145A while database writer 155A is executing the commands stored in first queue 160A. If database writer 155A determines that the available processing capacity of first processor 145A is no longer above a second threshold, first processor 145A stops executing the commands stored in first queue 160A. In certain embodiments, the value of the first threshold is equal to the value of the second threshold. In certain other embodiments, the value of the second threshold is lower than the value of the first threshold, given that first processor 145A must consume processing resources to write the data into second database 130. In certain embodiments, the values of the first and second thresholds are set by a system administrator. This disclosure contemplates that database writer 155B (and any number of other database writers assigned to given transaction types) behaves in a similar manner to database writer 155A.

If the commands stored in first queue 160A and second queue 160B are timely executed, second database 130 will contain the same data as stored in first database 125; the differences between first database 125 and second database 130 will merely be in the formats according to which the data is stored.

In certain embodiments, to help avoid any table locking in second database 130 that may occur when more than one fourth processor 175 (or, in certain embodiments, more than one database writer 155) attempts to write to second database 130 at the same time, each additional change to a transaction stored in second database 130 is treated as a fresh INSERT (with a timestamp) in database 130. Then, when third processor 135 later attempts to read a transaction from second database 130, it considers the most up to date transaction, based on the inserted timestamp.

Database writer 155A may be a software module stored in first memory 150A and executed by first processor 145A. Additionally, database writer 155B may be a software module stored in second memory 150B and executed by second processor 145B. An example algorithm for database writer 155A is as follows: receive a transaction request 165 from transaction analyzer 175; process the transaction request to determine data associated with the request; write the data to first segment 125a of first database 125; store a command in first queue 160A to additionally write this same data into second database 130. An example algorithm for database writer 155B is as follows: receive a transaction request 170 from transaction analyzer 175; process the transaction request to determine data associated with the request; write the data to second segment 125b of first database 125; store a command in second queue 160B to additionally write this same data into second database 130.

Third processor 135 is any electronic circuitry, including, but not limited to microprocessors, application specific integrated circuits (ASIC), application specific instruction set processor (ASIP), and/or state machines, that communicatively couples to third memory 140 and controls the operation of first component 105A of database tool 105. In certain embodiments, third processor 135 is additionally communicatively coupled to first processor 145A, first memory 150A, second processor 145B, second memory 150B, fourth processor 175, and/or fourth memory 180. Third processor 135 may be 8-bit, 16-bit, 32-bit, 64-bit or of any other suitable architecture. Third processor 135 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Third processor 135 may include other hardware and software that operates to control and process information. Third processor 135 executes software stored on third memory 140 to perform any of the functions described herein. Third processor 135 controls the operation and administration of first component 105A of database tool 105 by processing information received from network 120, device(s) 115, and third memory 140. Third processor 135 may be a programmable logic device, a microcontroller, a microprocessor, any suitable processing device, or any suitable combination of the preceding. Third processor 135 is not limited to a single processing device and may encompass multiple processing devices.

Third memory 140 may store, either permanently or temporarily, data, operational software, or other information for third processor 135. Third memory 140 may include any one or a combination of volatile or non-volatile local or remote devices suitable for storing information. For example, third memory 140 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in third memory 140, a disk, a CD, or a flash drive. In particular embodiments, the software may include an application executable by third processor 135 to perform one or more of the functions described herein.

Fourth processor 175 is any electronic circuitry, including, but not limited to microprocessors, application specific integrated circuits (ASIC), application specific instruction set processor (ASIP), and/or state machines, that communicatively couples to fourth memory 180, first memory 150A, and second memory 150B and controls the operation of fourth component 105D of database tool 105. In certain embodiments, fourth processor 175 is additionally communicatively coupled to first processor 145A, second processor 145B, third processor 135, and/or third memory 140. Fourth processor 175 may be 8-bit, 16-bit, 32-bit, 64-bit or of any other suitable architecture. Fourth processor 175 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Fourth processor 175 may include other hardware and software that operates to control and process information. Fourth processor 175 executes software stored on fourth memory 180 to perform any of the functions described herein. Fourth processor 175 controls the operation and administration of fourth component 105D of database tool 105 by processing information received from network 120, device(s) 115, and fourth memory 180. Fourth processor 175 may be a programmable logic device, a microcontroller, a microprocessor, any suitable processing device, or any suitable combination of the preceding. Fourth processor 175 is not limited to a single processing device and may encompass multiple processing devices.

Fourth memory 180 may store, either permanently or temporarily, data, operational software, or other information for fourth processor 175. Fourth memory 180 may include any one or a combination of volatile or non-volatile local or remote devices suitable for storing information. For example, fourth memory 180 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in fourth memory 180, a disk, a CD, or a flash drive. In particular embodiments, the software may include an application executable by fourth processor 175 to perform one or more of the functions described herein.

First processor 145A is any electronic circuitry, including, but not limited to microprocessors, application specific integrated circuits (ASIC), application specific instruction set processor (ASIP), and/or state machines, that communicatively couples to first memory 150A and third processor 135 and controls the operation of second component 105B of database tool 105. In certain embodiments, first processor 145A is additionally communicatively coupled to second processor 145B, second memory 150B, third memory 140, fourth processor 175, and/or fourth memory 180. First processor 145A may be 8-bit, 16-bit, 32-bit, 64-bit or of any other suitable architecture. First processor 145A may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. First processor 145A may include other hardware and software that operates to control and process information. First processor 145A executes software stored on first memory 150A to perform any of the functions described herein. First processor 145A controls the operation and administration of second component 105B of database tool 105 by processing information received from network 120, device(s) 115, and first memory 150A. First processor 145A may be a programmable logic device, a microcontroller, a microprocessor, any suitable processing device, or any suitable combination of the preceding. First processor 145A is not limited to a single processing device and may encompass multiple processing devices.

First memory 150A may store, either permanently or temporarily, data, operational software, or other information for first processor 145A. First memory 150A may include any one or a combination of volatile or non-volatile local or remote devices suitable for storing information. For example, first memory 150A may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in first memory 150A, a disk, a CD, or a flash drive. In particular embodiments, the software may include an application executable by first processor 145A to perform one or more of the functions described herein.

Second processor 145B is any electronic circuitry, including, but not limited to microprocessors, application specific integrated circuits (ASIC), application specific instruction set processor (ASIP), and/or state machines, that communicatively couples to second memory 150B and third processor 135 and controls the operation of third component 105C of database tool 105. In certain embodiments, second processor 145B is additionally communicatively coupled to first processor 145A, first memory 150A, third memory 140, fourth processor 175, and/or fourth memory 180. Second processor 145B may be 8-bit, 16-bit, 32-bit, 64-bit or of any other suitable architecture. Second processor 145B may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Second processor 145B may include other hardware and software that operates to control and process information. Second processor 145B executes software stored on second memory 150B to perform any of the functions described herein. Second processor 145B controls the operation and administration of third component 105C of database tool 105 by processing information received from network 120, device(s) 115, and second memory 150B. Second processor 145B may be a programmable logic device, a microcontroller, a microprocessor, any suitable processing device, or any suitable combination of the preceding. Second processor 145B is not limited to a single processing device and may encompass multiple processing devices.

Second memory 150B may store, either permanently or temporarily, data, operational software, or other information for second processor 145B. Second memory 150B may include any one or a combination of volatile or non-volatile local or remote devices suitable for storing information. For example, second memory 150B may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in second memory 150B, a disk, a CD, or a flash drive. In particular embodiments, the software may include an application executable by second processor 145B to perform one or more of the functions described herein.

In certain embodiments database tool 105 enables the operation of a database system 100 that is both read and write efficient, in part by maintaining the same data in both a write-efficient first database 125 as well as a read-efficient second database 130. To store data in the write-efficient first database 125, database tool 105 assigns each of first processor 145A and second processor 145B to a different transaction type, as well as to a different segment of the write-efficient first database 125. In this manner, both first processor 145A and second processor 145B are able to process transaction requests 165 and 170 and write to first database 125 simultaneously. After first processor 145A or second processor 145B has finished writing a piece of data into first segment 125a or second segment 125b of write-efficient first database 125, the processor stores a command to write the same data in read-efficient second database 130 in first queue 160A or second queue 160, which one or more fourth processors 175 execute. In this manner, writing to the read-efficient second database 125 does not negatively impact the performance of the processor in handling transaction requests directed towards write operations.

Figure 2:
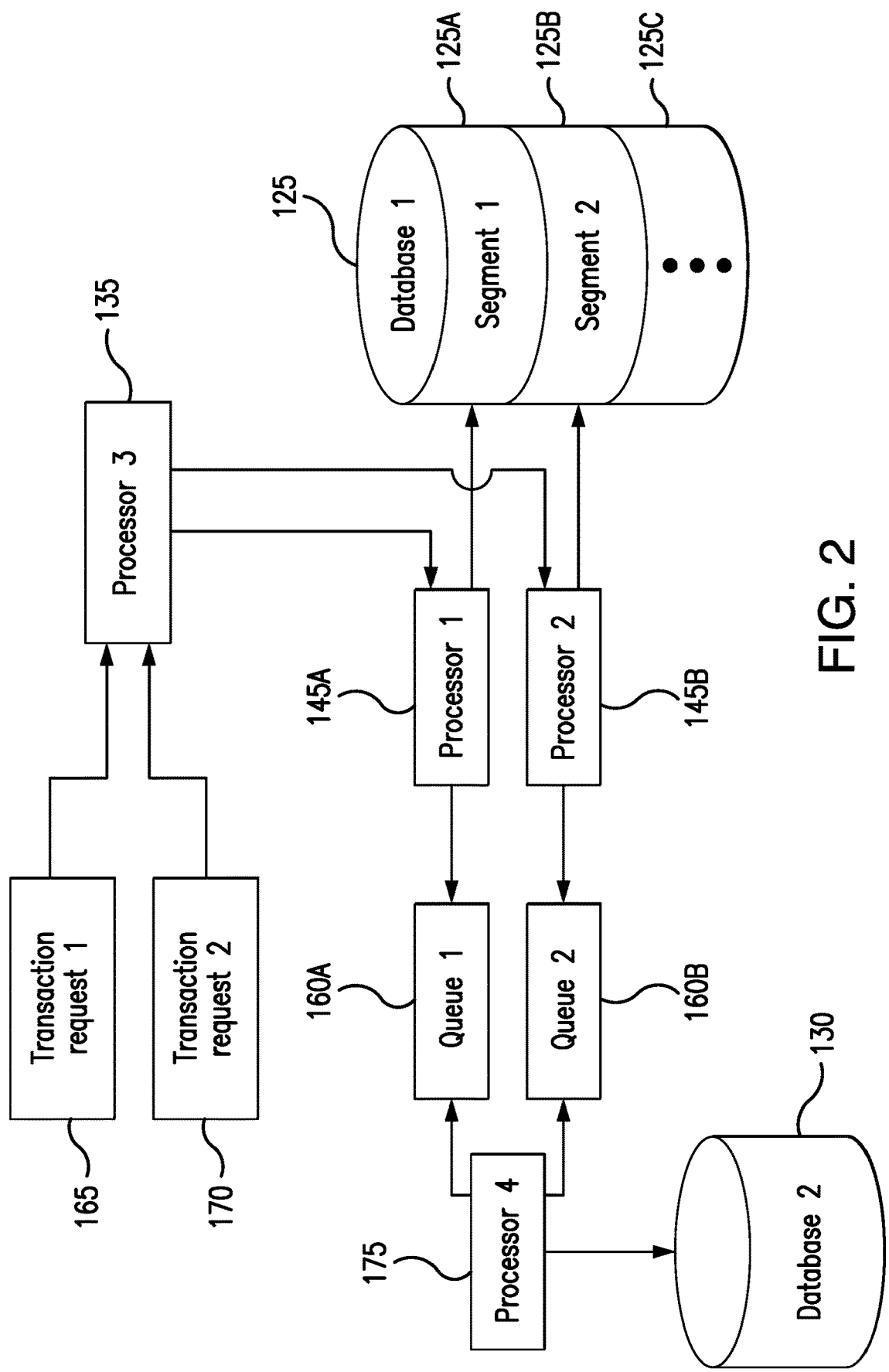
FIG. 2 illustrates the processes by which the database tool of the system of FIG. 1 writes transactions to the write-efficient database as well as the read-efficient database of the system of FIG. 1.

FIG. 2 further illustrates the processes by which database tool 105 writes transactions to first database 125 and second database 130. As can be seen, third processor 135 receives a first transaction request 165 and a second transaction request 170 from users 110. Third processor 135 determines that first transaction request 165 is assigned to a first transaction type and second transaction request 170 is assigned to a second transaction type. In response, third processor 135 sends first transaction request 165 to first processor 145A, which is assigned to the first transaction type, and sends second transaction request 170 to second processor 145B, which is assigned to the second transaction type. First processor 145A then writes data associated with first transaction request 165 into first segment 125A of first database 125, which is assigned to the first transaction type. Additionally, second processor 145B writes data associated with second transaction request 170 into second segment 125B of first database 125, which is assigned to the second transaction type. This disclosure contemplates that first processor 145A is assigned to first segment 125A of first database 125, such that first processor 145A only writes to first segment 125A of first database 125 when processing transaction requests, and second processor 145B is assigned to second segment 125B of first database 125, such that second processor 145B only writes to second segment 125B of second database 125 when processing transaction request.

After first processor 145A and second processor 145B have written a piece of data to first database 125, first processor 145A and second processor 145B additionally store commands to write the same data to second database 130 in queues 160A and 160B, respectively. Fourth processor 175 then accesses queues 160A and 160B and executes the stored commands, thereby writing the data to second database 130. Using separate fourth processors 175 to execute the commands stored in first queue 160A and second queue 160B may be desirable to help ensure that there is limited delay in replicating data from first database 125 into second database 130. This may be desirable for those users 110 who wish to view the results of their transaction requests 165 and 170 very shortly after they submit the transaction requests to database tool 105.

In certain other embodiments, rather than implementing separate, dedicated processors 175 to execute the commands stored in first queue 160A and second queue 160B, first processor 145A and second processor 145B may additionally execute the commands stored in first queue 160A and second queue 160B, to write the same data to second database 130 themselves. However, because second database 130 is not a write-efficient database, this may end up taking significant amounts of processing resources. Therefore, in order to ensure both first processor 145A and second processor 145 have enough available processing capacity to efficiently process the transaction requests 165 and 170 they receive, first processor 145A and second processor 145B store commands to write the data into second database 130 in queues for later processing. When first processor 145A determines that its available processing capacity is above a first threshold, it executes the commands stored in its queue, which includes the command to write data into second database 130. Similarly, when second processor 145B determines that its available processing capacity is above the first threshold, it executes the commands stored in its queue, which includes the command to write data into second database 130. In this manner, database tool 105 helps to ensure that the data written into write-efficient first database 125 is also stored in read-efficient second database 130 for later access, without impacting the performance of first processor 145A and second processor 145B in processing transaction requests 165 and 170.

In certain such embodiments, first processor 145A and second processor 145B continually monitor their available processing capacities while they are executing the commands stored in their queues. If first processor 145A determines that its available processing capacity is no longer above a second threshold, first processor 145A stops executing the commands stored in its queue. Similarity, if second processor 145B determines that its available processing capacity is no longer above the second threshold, second processor 145B stops executing the commands stored in its queue. In certain embodiments, the value of the first threshold is equal to the value of the second threshold. In certain other embodiments, the value of the second threshold is lower than the value of the first threshold, given that first processor 145A and second processor 145B must consume processing resources to write the data into second database 130. In certain embodiments, the values of the first and second thresholds are set by a system administrator. Using first processor 145A and second processor 145B to write both the write-efficient first database 125 and read-efficient second database 130 may be desirable in situations in which the number of available processors for use in system 100 is limited, and/or it is not expected that users 110 will wish to view the results of their transaction requests 165 and 170 soon after they submit the transaction requests to database tool 105.

In certain embodiments, to help avoid any table locking in second database 130 that may occur when more than one fourth processor 175 (or, in certain embodiments, more than one database writer 155) attempts to write to second database 130 at the same time, each additional change to a transaction stored in second database 130 is treated as a fresh INSERT (with a timestamp) in database 130. Then, when third processor 135 later attempts to read a transaction from second database 130, it considers the most up to date transaction, based on the inserted timestamp.

The result of the operations illustrated in FIG. 2 is that data associated with transaction requests 165 and 170 that is written into write-efficient first database 125 is also stored in read-efficient second database 130 for later access.

FIGS. 3A and 3B present examples illustrating potential differences between a format of the data stored in write-efficient database 125 and a format of the data stored in read-efficient database 130. FIG. 3A presents an example illustrating financial data for individuals Aa, Bb, and Cc, stored in a write-efficient form. The financial data includes the dates these individuals opened various banking accounts, illustrated in table 320, as well as a subset of the transactions these individuals performed using their banking accounts, illustrated in table 315. As can be seen, each piece of information stored in tables 305 through 320 is stored in a single location, in a single table. Each piece of data is further stored according to a key, such that if another table references the data, it does so using the key assigned to the data. For example, table 305 stores names and cities according to a Customer ID key, and table 310 stores banking account descriptions according to an Account ID key. As can be seen, customer ID 1 is assigned to Aa, who lives in New York, customer ID 2 is assigned to Bb, who lives in Washington, and customer ID 3 is assigned to Cc, who lives in Dallas. Similarly, account ID 1 is assigned to "checking account," account ID 2 is assigned to "savings account," and account ID 3 is assigned to "credit card." In this manner, when database tool 105 stores information about a $300 transaction engaged in by Aa using his savings account in table 315, the tool may simply refer to customer Aa using customer ID 1 and to the savings account using account ID 2. Similarly, when database tool 105 stores information indicating that customer Bb opened a checking account on May 7, 1992 in table 320, the tool may simply refer to customer Bb using customer ID 2 and to the checking account using account ID 1. This facilitates write-efficiency given that, any time database tool 105 updates a piece of information stored in the set of tables 305 through 320, it only needs to update a single entry in the set of tables, as the key associated with the piece of information does not need to change. For example, if customer Cc changed her name after she got married, database tool 105 would only need to update this name in table 305; because tables 315 and 320 refer to customer Cc using customer ID key 3, which does not change when the customer's name is updated, these tables do not need any modification.

On the other hand, when database tool 105 attempts to read information from tables 305 through 320, the process is not so simple. For example, if database tool 105 responds to a query requesting information about the $1005.00 transaction that Cc engaged in, not only will database tool 105 access table 315, in which information about the transaction is maintained, database tool 105 will additionally access table 310 to determine that account ID 2 corresponds to a savings account and table 305 to determine that customer ID 3 is assigned to Cc. Thus, while the set of tables 305 through 320 are write-efficient, they are not read-efficient.

In contrast, tables 325 and 330, illustrated in FIG. 3B, are read-efficient tables but not write-efficient tables. As can be seen, database tool 105 can determine that customer Cc engaged in the $1005.00 transaction using her savings account, simply by reading the fourth line of table 325; database tool 105 does not need to access any further tables stored in the database. On the other hand, if customer Cc changes her name, not only will database tool 105 have to update the customer name entry in the fourth line of table 325, it must also update the customer name entries in the 6th and 7th lines of table 330, and any other locations in second database 130 in which the customer's name is stored. Not only will this consume more processing resources than writing to a single location in the database, this brings with it multiple opportunities for the introduction of errors into the database, if database tool 105 fails to properly update one of these 3 locations.

In certain embodiments, database tool 105 contains additional components to help ensure that first database 125 and second database 130 contain consistent data. This may be desirable in situations in which concern exists as to whether the commands stored in first queue 160A and second queue 160B, to write data into second database 130, are properly and timely executed. Additionally, this helps to ensure that errors are not introduced into second database 130 when processors 145A and 145B write the data stored in first database 125 to multiple locations in second database 130. These additional components are illustrated in FIG. 4.

Figure 4:
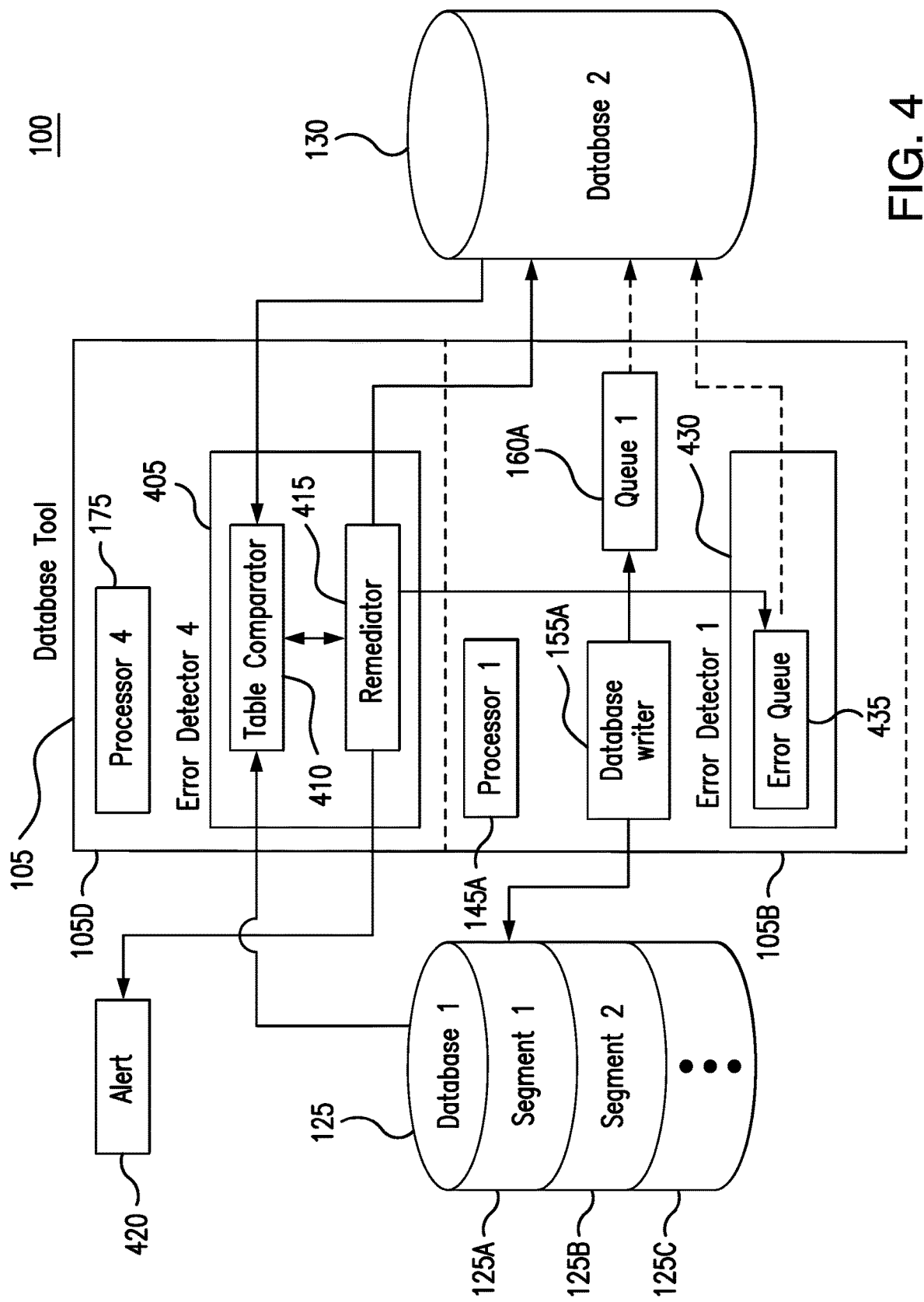
FIG. 4 illustrates an example embodiment of the database tool of the system of FIG. 1 which contains additional components to help ensure that the read-efficient database and the write-efficient database of the system of FIG. 1 maintain consistent data.

As can be seen in FIG. 4, in certain embodiments, fourth component 105D of database tool 105 may additionally contain fourth error detector 405, and second component 105B of database tool 105 may additionally contain first error detector 430. This disclosure further contemplates that third component 105C of database tool 105 may additionally contain a second error detector component that operates in a similar manner to first error detector 430; for simplicity, third component 105C of database tool 105 has not been illustrated in FIG. 4.

First error detector 430 determines that a piece of data written by database writer 155A into first segment 125A of first database 125 has not been written into second database 130. For example, in certain embodiments, first error detector 430 may determine that a command to write a piece of data into second database 130, stored in first queue 160A, has not been executed by fourth processor 135. In certain other embodiments, first error detector 430 may compare the data stored in first segment 125A of first database 125 to the data stored in second database 130 and determine that certain data stored in first segment 125A is not stored in second database 130. In certain such embodiments, first error detector 430 may perform this comparison at a scheduled time each day when the processing capacity of first processor 145A is expected to be high (for example, during the night when few users 110 access the system). In other such embodiments, first error detector 430 may perform this comparison in response to a request from a system administrator to ensure consistency between first database 125 and second database 130. In further such embodiments, first error detector 430 may perform this comparison whenever the processing capacity of first processor 145A is above a threshold and database writer 155A is not executing commands stored in first queue 160A.

In response to determining that a piece of data stored in first segment 125A of first database 125 has not been written into one or more locations in second database 130, first error detector 430 stores a command in error queue 435 to write the piece of data into one or more locations in second database 130. In certain embodiments, remediator 415 of fourth error detector 405 then executes the commands stored in error queue 435. In certain such embodiments, remediator 415 executes the commands stored in error queue 435 as soon as it detects that commands are present in error queue 435. In other such embodiments, remediator 415 executes the commands stored in error queue 435 at a scheduled time each day.

In other embodiments, instead of fourth processor 175 executing the commands stored in first queue 160A, first error detector 430 executes these commands. In certain such embodiments, first error detector 430 executes the commands stored in error queue 435 at a scheduled time each day when the processing capacity of first processor 145A is expected to be high (for example, during the night when few users 110 access the system). In further embodiments, first error detector 430 may execute the commands stored in error queue 430 whenever the processing capacity of first processor 145A is above a threshold. In certain embodiments, the value of the threshold is set by a system administrator.

First error detector 430 may be a software module stored in first memory 150A and executed by first processor 145A. An example algorithm for first error detector 430 is as follows: determine that a command stored in first queue 160A to write a piece of data to second database 130 has not been executed; store a command to write the piece of data to second database 130 in error queue 403. Another example algorithm for first error detector 430 is as follows: access first segment 125A of first database 125; access second database 130; for each piece of data stored in first segment 125A: {determine whether a piece of data stored in first segment 125A has been written into one or more locations in second database 130; if a piece of data stored in first segment 125A of first database 125 has not been written into one or more locations in second database 130, store a command to write the piece of data into second database 130 in error queue 435}.

Fourth error detector 405 determines that an inconsistency exists between the data stored in first database 125 and the data stored in second database 130. For example, in certain embodiments, fourth error detector 405 implements table comparator 410 to compare the data stored in first database 125 with the data stored in second database 130 and to determine that a piece of data stored in first database 125 is not stored in second database 130. In other embodiments, fourth error detector 405 may implement table comparator 410 to determine that an inconsistency exists in the data stored in second database 130. For example, table comparator 410 may determine that, while a piece of data stored in first database 125 is also stored in second database 130, it is only stored in one of the two locations of second database 130 in which it belongs. In response to determining that an inconsistency exists between the data stored in first database 125 and the data stored in second database 130, fourth error detector 405 implements remediator 415 to eliminate the inconsistency. For example, in certain embodiments, remediator copies the data stored in first database 125 that is not stored in second database 130 into second database 130. In certain embodiments, remediator 415 additionally sends an alert 420 to an administrator of database tool 105, notifying the administrator that an inconsistency between first database 125 and second database 130 has been detected.

In certain embodiments, fourth error detector 405 may implement table comparator 410 at a scheduled time each day. In other embodiments, fourth error detector 405 may implement table comparator 410 in response to a request from a system administrator to ensure consistency between first database 125 and second database 130.

In certain embodiments, prior to implementing table comparator 410, fourth error detector 405 implements remediator 415 to access error queue 435 and determine whether error queue 435 contains any commands to write data into second database 130. If any commands to write data into second database 130 are present in error queue 435, remediator 415 executes the commands. In certain embodiments, remediator 415 receives a notification from first processor 145A as soon as a new command is written to error queue 435. In other embodiments where table comparator 410 compares first database 125 to second database 130 at scheduled times each day, remediator 415 scans error queue 435 according to that same schedule.

Fourth error detector 405 may be a software module stored in fourth memory 180 and executed by fourth processor 175. An example algorithm for fourth error detector 405 is as follows: determine whether the current time is the scheduled time; if the current time is the scheduled time: {access error queue 435; determine if a command to write data into second database 130 is stored in error queue 435; if a command to write data into second database 130 is stored in error queue 435, execute the command; access first database 125; access second database 130; for each piece of data stored in first database 125: {determine whether a piece of data stored in first database 125 has been written into one or more locations in second database 130; if a piece of data stored in first database 125 has not been written into one or more locations in second database 130: {write the piece of data into one or more locations of second database 130; send an alert 420 to a system administrator notifying the system administrator of the inconsistency in the two databases.}}}

By employing error detectors 430 and 405, certain embodiments of database tool 105 help to ensure consistency between the read-efficient and the write-efficient databases maintained in system 100.

Figure 5:
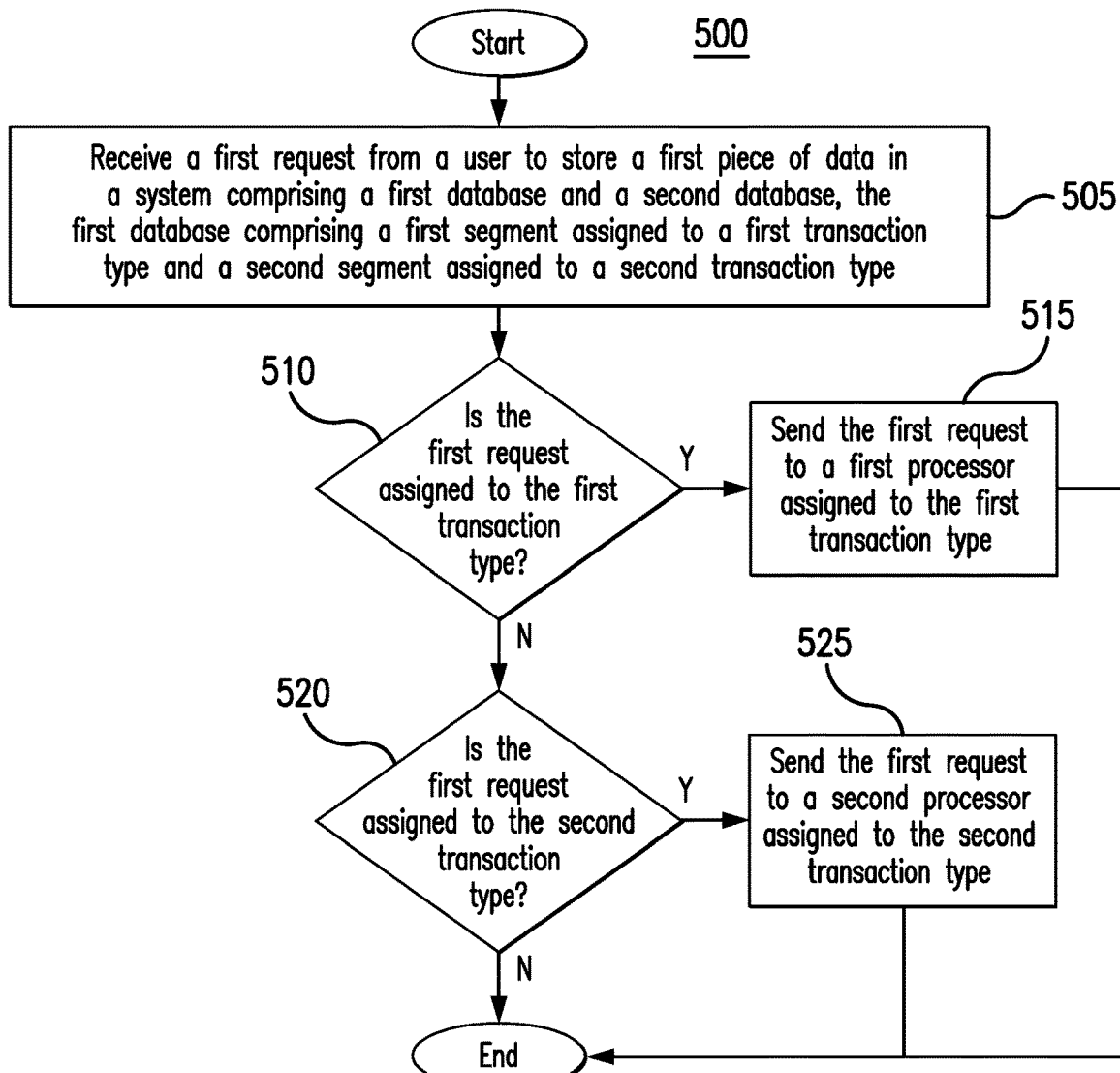
FIG. 5 presents a flowchart illustrating the process by which each processor of a set of processors belonging to the database tool of the system of FIG. 1 may be assigned a transaction request to process.
Figure 6:
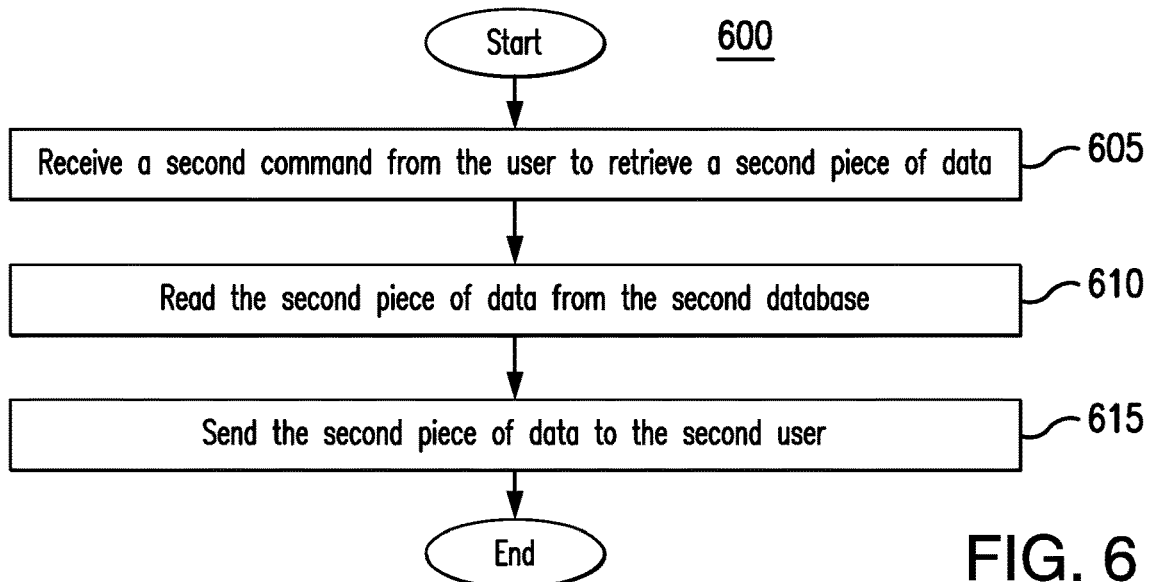
FIG. 6 presents a flowchart illustrating a basic process by which the database tool of the system of FIG. 1 may retrieve data stored in the read-efficient database of the system of FIG. 1.

FIGS. 5 through 7 present flowcharts illustrating the operation of database tool 105 in the context of storing data in system 100.

FIG. 5 presents a flowchart illustrating the process by which third processor 135 determines to which of first processor 145A and second processor 145B to send a given transaction request 165 or 170. In step 505, third processor 135 receives a first request 165 from a user 110 to store a first piece of data in system 100. As discussed above, system 100 contains write-efficient first database 125 and read-efficient second database 130. Write-efficient first database 125 contains first segment 125A assigned to a first transaction type and second segment 125B assigned to a second transaction type. In step 510, third processor 135 determines whether first request 165 is assigned to the first transaction type. If third processor 135 determines that first request 165 is assigned to the first transaction type, then in step 515, third processor 135 sends first request 165 to first processor 145A, assigned to the first transaction type. If, in step 510, third processor 135 determines that first request 165 is not assigned to the first transaction type, then in step 520, third processor 135 next determines if first request 165 is assigned to the second transaction type. If third processor 135 determines that first request 165 is assigned to the second transaction type, then in step 525, third processor 135 sends first request 165 to second processor 145B, assigned to the second transaction type.

While the flowchart of FIG. 5 simply illustrates an embodiment of database tool 105 containing first processor 145A, assigned to a first transaction type, and second processor 145B, assigned to a second transaction type, this disclosure contemplates that any number of additional processors may exist, each assigned to a different potential transaction type.

Modifications, additions, or omissions may be made to method 500 depicted in FIG. 5. Method 500 may include more, fewer, or other steps. For example, steps may be performed in parallel or in any suitable order. While discussed as database tool 105 (or components thereof) performing the steps, any suitable component of system 100, such as device(s) 115 for example, may perform one or more steps of the method.

FIG. 6 presents a flowchart illustrating a basic process by which database tool 105 may retrieve data stored in second database 130. A more efficient process is presented below, in the discussion of FIG. 11.

In step 605, database tool 105 receives a command from a user 110 to retrieve a piece of data stored in database 130. In step 610, database tool 105 reads the piece of data from the second database 130. Finally, in step 615, database tool 105 sends the piece of data to user 110.

Modifications, additions, or omissions may be made to method 600 depicted in FIG. 6. Method 600 may include more, fewer, or other steps. For example, steps may be performed in parallel or in any suitable order. While discussed as database tool 105 (or components thereof) performing the steps, any suitable component of system 100, such as device(s) 115 for example, may perform one or more steps of the method.

Figure 7A:
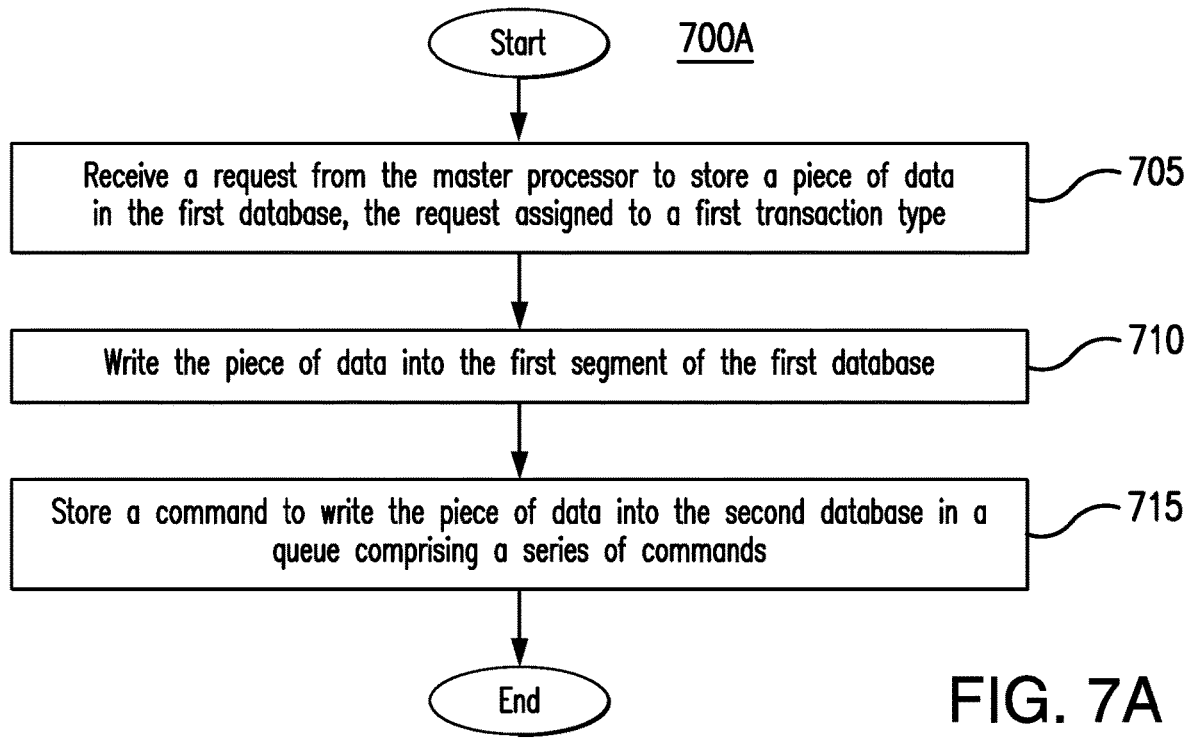
FIGS. 7A and 7B present flowcharts illustrating the processes by which data associated with a transaction request is written to both the write-efficient and the read-efficient databases.
Figure 7B:
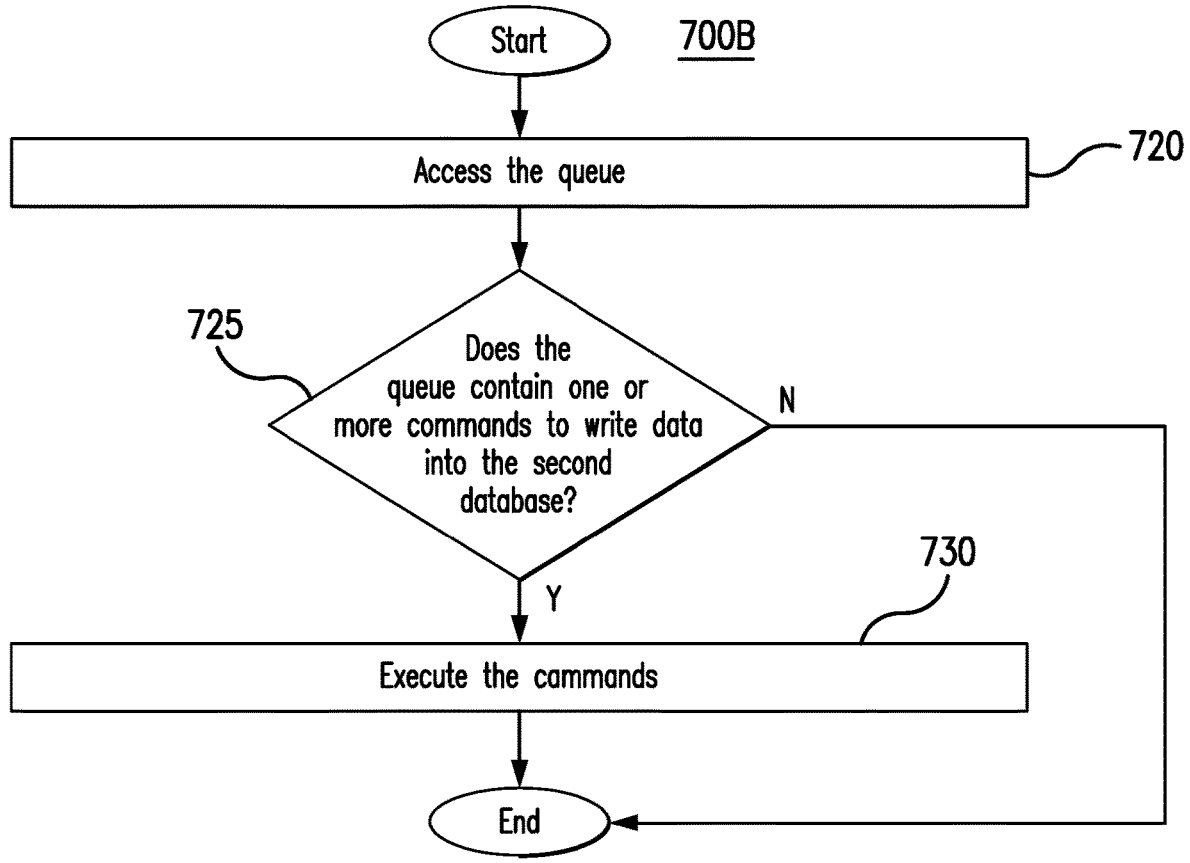

FIGS. 7A and 7B illustrate the processes by which data associated with a transaction request is written to both the write-efficient and the read-efficient databases. FIG. 7A presents a flowchart illustrating the process by which either first processor 145A, assigned to the first transaction type, or second processor 145B, assigned to the second transaction type, processes a request that it has received from third processor 135. In step 705, the processor receives a request from third processor 135 to store a piece of data in first database 125. Here, for simplicity, assume that the request is assigned to a first transaction type and the first transaction type is assigned to a first segment 125A of first database 125. In step 710, the processor writes the piece of data into first segment 125A of first database 125. Next, in step 715, the processor stores a command to write the piece of data into second database 130 in a queue that contains a series of commands.

Modifications, additions, or omissions may be made to method 700A depicted in FIG. 7A. Method 700A may include more, fewer, or other steps. For example, steps may be performed in parallel or in any suitable order. While discussed as database tool 105 (or components thereof) performing the steps, any suitable component of system 100, such as device(s) 115 for example, may perform one or more steps of the method.

FIG. 7B illustrates the process by which fourth processors 175 write the data stored in read-efficient database 125 into write-efficient database 130. In step 720, fourth processor 175 accesses the queue. In step 725, fourth processor 175 determines whether the queue contains one or more commands to write data into second database 130. If fourth processor 175 determines that the queue does contain one or more commands to write data into second database 130, then in step 730, fourth processor 175 executes the commands.

Modifications, additions, or omissions may be made to method 700B depicted in FIG. 7B. Method 700B may include more, fewer, or other steps. For example, steps may be performed in parallel or in any suitable order. While discussed as database tool 105 (or components thereof) performing the steps, any suitable component of system 100, such as device(s) 115 for example, may perform one or more steps of the method.

FIGS. 8 through 11 focus on the operation of database tool 105 in response to receiving a query from a user 110, directed towards data stored in system 100.

Figure 8:
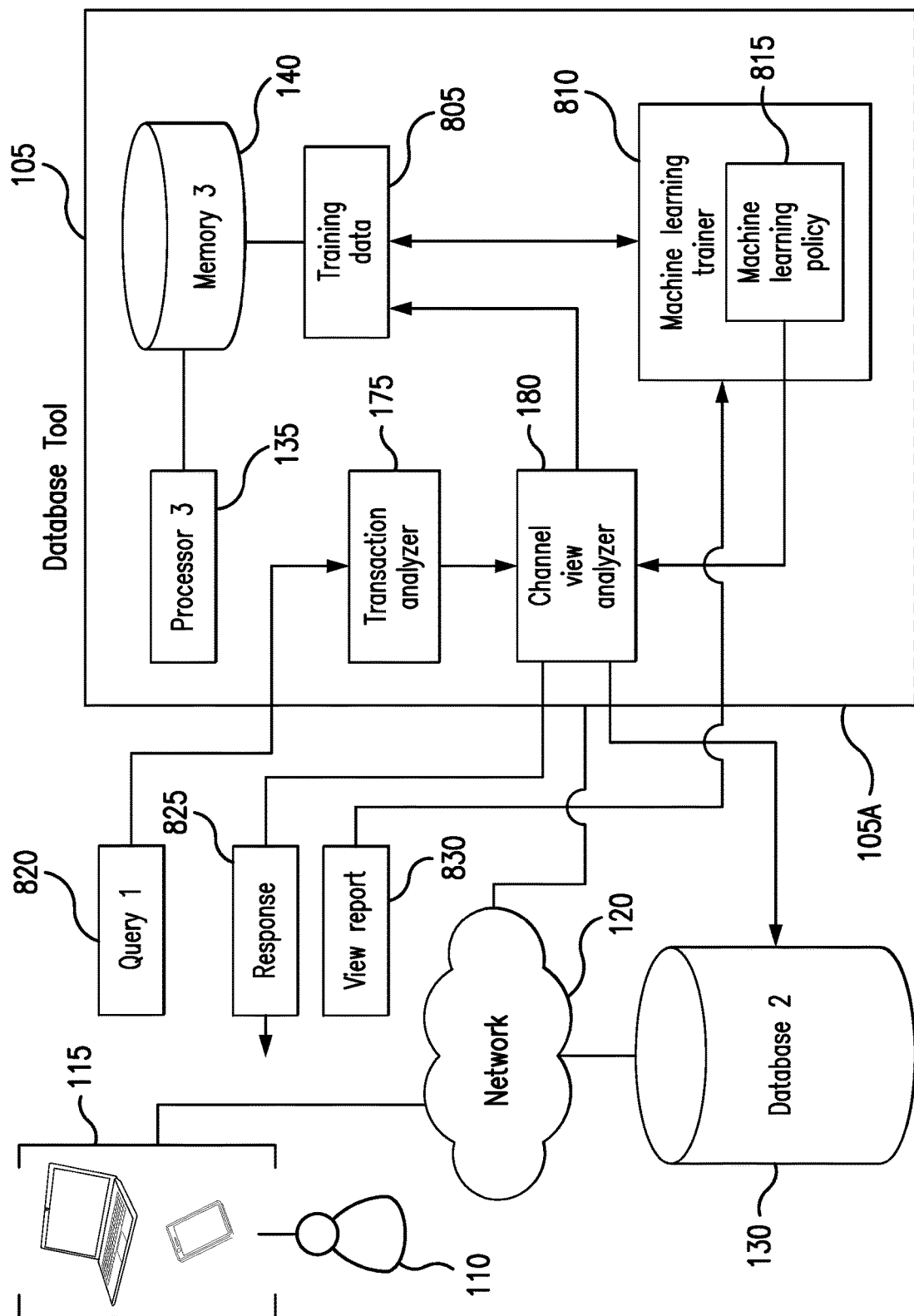
FIG. 8 further illustrates the example system of FIG. 1, with an emphasis on the components of the database tool of the system of FIG. 1 that are used to read data stored in the system.

FIG. 8 presents an additional illustration of the database tool 105 of system 100, with an emphasis on the components of database tool 105 used to respond to queries 820 received from users 110. For simplicity, FIG. 8 presents only first component 105A of database tool 105. However, second component 105B and third component 105C are additionally present in the system, as are any number of other components, each assigned to a given transaction type.

As seen in FIG. 8, and as described above, in the discussion of FIG. 1, the first component 105A of database tool 105 contains third processor 135 and third memory 140. This disclosure contemplates third processor 135 and third memory 140 being configured to perform any of the functions of first component 105A of database tool 105 described herein. Generally, first component 105A of database tool 105 implements transaction analyzer 175, channel view analyzer 180, and machine learning trainer 810.

Transaction analyzer 175 receives a query 820 from a user device 115 requesting information stored in second database 130. Transaction analyzer 175 determines that query 820 is requesting that database tool 105 read data stored in system 100, rather than seeking to store data in system 100. Consequently, transaction analyzer 175 sends query 820 to channel view analyzer 180.

Channel view analyzer 180 receives query 820 from transaction analyzer 175. Query 820 is directed towards a transaction stored in second database 130. Each transaction stored in second database 130 is composed of a set of fields. As an example, a payment transaction stored in second database 130 may contain a payment amount field, a payment source field, a payment destination field, a payment location field, and a payment date field. Query 820 is additionally assigned to a given channel. For example, in certain embodiments the channel corresponds to the type of device 115 from which query 820 was sent and/or to which response 825 is received. In other embodiments, the channel corresponds to a combination of the type of device 115 from which query 820 was sent and/or to which response 825 is received, as well as the user 110 who submitted query 820.

In response to receiving query 820, channel view analyzer 180 determines to which transaction, of the set of transactions stored in second database 130, query 820 is directed. Channel view analyzer 180 additionally determines if a threshold number of queries have been received by database tool 105. In certain embodiments, the value of the threshold number is set by a system administrator. If channel view analyzer 180 determines that the threshold number of queries have not been received, then channel view analyzer 180 accesses second database 130, retrieves the set of fields associated with the transaction to which query 820 is directed, and sends the set of fields to user device 115. Channel view analyzer 180 further determines which fields of the set of fields associated with the transaction the user accessed using device 115. Channel view analyzer 180 stores this subset, along with the channel associated with query 820, in training data 805, to be used by machine learning trainer 810 to train machine learning policy 815.

On the other hand, if channel view analyzer 180 determines that the threshold number of queries have been received by database tool 105, channel view analyzer then uses machine learning policy 815 to determine a subset of the set of fields associated with the transaction to which query 820 is directed (i.e. a view of the transaction), which the channel assigned to query 820 is likely to access. Channel view analyzer then accesses this subset of the set of fields associated with the transaction and sends this view of the transaction to user device 115. As an example, channel view analyzer 180 may use machine learning policy 815 to determine that a user 110 who uses a mobile phone to send a query 820 related to a payment transaction stored in second database 130 is likely to view the payment amount and the payment destination fields of the query response 825, using the device 115. Therefore, channel view analyzer 180 may read the payment amount and the payment destination from second database 130 and send these fields to the user device 115, rather than reading and sending the entire set of fields associated with the transaction to the device 115. In this manner, database tool 105 further reduces the processor resources required to read data from the read-efficient database 130.

In certain embodiments, using machine learning policy 815 to determine that a subset of the set of fields associated with the transaction to which query 820 is directed, which the channel assigned to query 820 is likely to access, includes using the machine learning policy 815 to determine that the probability that the given user channel accesses the subset of the set of fields is greater than a set percentage.

Channel view analyzer 180 may be a software module stored in third memory 140 and executed by third processor 135. An example algorithm for channel view analyzer 180 is as follows: receive query 820 from transaction analyzer 175; determine to which transaction, of the set of transactions stored in second database 130, query 820 is directed; determine if a threshold number of queries have been received; if a threshold number of queries have been received: {use machine learning policy 815 to determine a subset of the set of fields associated with the transaction to which query 820 is directed, which the channel assigned to query 820 is likely to access; read this subset of the set of fields associated with the transaction from second database 130; send this subset of the set of fields to user device 115}; if a threshold number of queries have not been received: {access second database 130; retrieve the set of fields associated with the transaction; send the set of fields to user device 115; determine which fields of the set of fields associated with the transaction that user 110 accessed using device 115; store this subset, along with the channel associated with query 820, in training data 805, stored in memory 140}.

Machine learning trainer 810 trains a machine learning policy 815 to generate a set of transaction views assigned to different user channels, based on training data 805, stored in third memory 140. Training data 805 contains subsets of fields of various transactions stored in second database 130 that users 110 previously accessed, using devices 115 (i.e., training data 805 contains a set of user channels and associated transaction views). In certain embodiments, machine learning trainer 810 determines a transaction view for a given transaction and a given user channel, by determining that the probability that the given user channel accesses the transaction view (consisting of a subset of fields of the set of fields associated with the transaction) is greater than a set percentage. In certain embodiments, machine learning trainer 810 uses a classification algorithm to train machine learning policy 815. In certain other embodiments, machine learning trainer 810 uses a logistic regression algorithm to train machine learning policy 815.

Machine learning trainer 810 may be a software module stored in third memory 140 and executed by third processor 135. An example algorithm for machine learning trainer 810 is as follows: access training data 805 stored in third memory 140; implement a logistic regression algorithm to associate user channels with transaction views.

Figure 9:
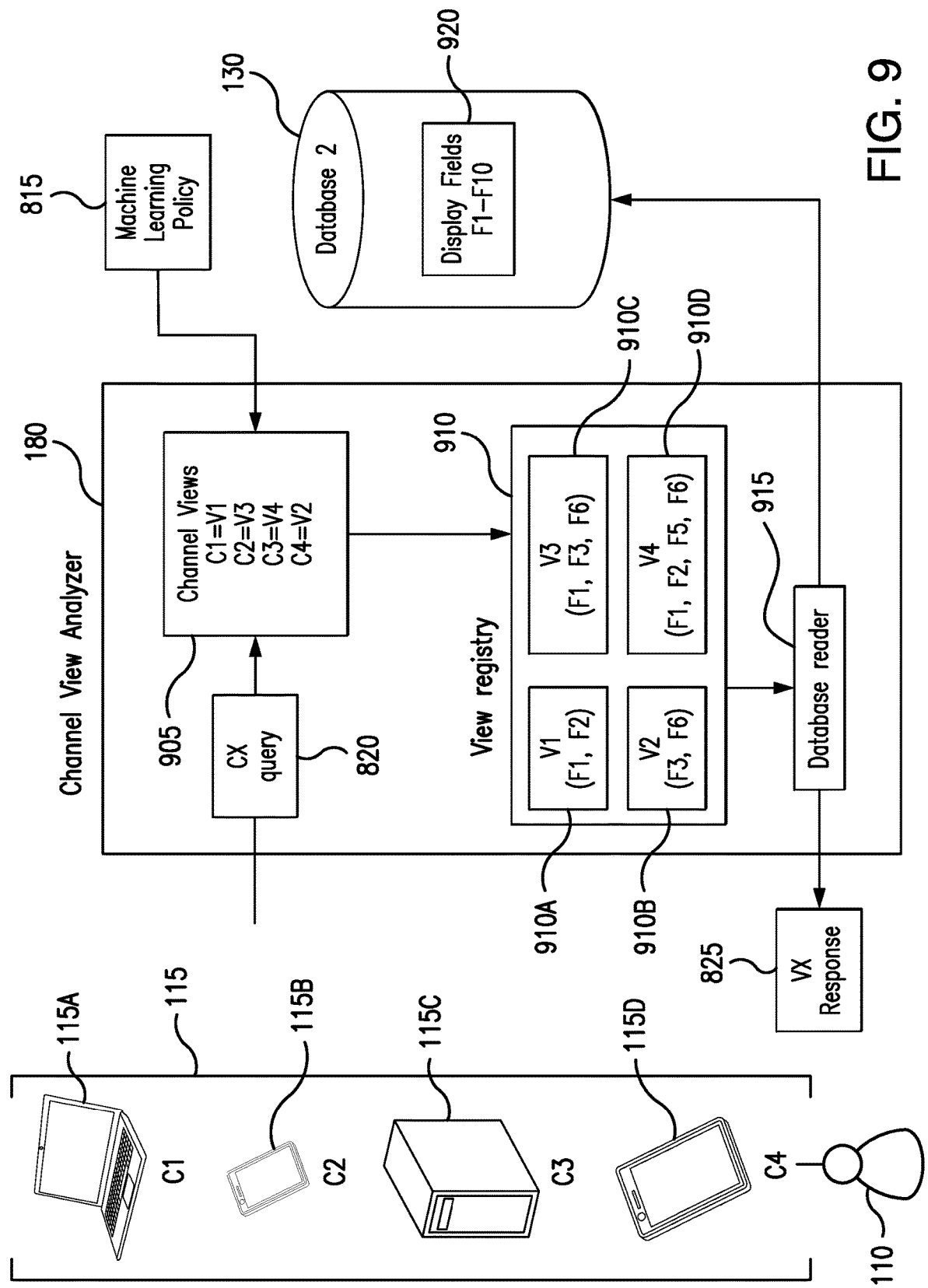
FIG. 9 illustrates the processes by which the database tool of the system of FIG. 1 receives and responds to user queries directed to transactions stored in the read-efficient database of the system of FIG. 1.

FIG. 9 further illustrates the processes by which channel view analyzer 180 receives and responds to user queries 820 directed to transactions stored in second database 130.

Channel view analyzer 180 receives queries 820, each associated with a particular user channel. In certain embodiments the channel corresponds to the type of device 115 from which query 820 was sent and/or to which response 825 is received. Accordingly, in such embodiments, a first channel may correspond to a laptop 115A, a second channel may correspond to a mobile phone 115B, a third channel may correspond to a desktop or server 115C, and a fourth channel may correspond to a tablet 115D. In other embodiments, the channel corresponds to a combination of the type of device 115 from which query 820 was sent and/or to which response 825 is received, as well as the user 110 who submitted query 820. Accordingly, in such embodiments, a first channel may correspond to a laptop 115A operated by user 110, a second channel may correspond to a mobile device operated by user 110, a third channel may correspond to a desktop or server 115C operated by user 110, and a fourth channel may correspond to a tablet operated by user 110.

For a given transaction, channel view analyzer 180 uses machine learning policy 815 to determine a view 905 assigned to a given channel. For example, as illustrated in FIG. 9, channel view analyzer 180 determines that the first channel is assigned to a first view, the second channel is assigned to a third view, the third channel is assigned to a fourth view, and the fourth channel is assigned to a second view. Each of these views is stored by channel view analyzer in view registry 910. For example, view registry 910 indicates that the first view 910A corresponds to the first and second fields of the transaction, the second view 910B corresponds to the third and sixth fields of the transaction, the third view 910C corresponds to the first, third, and sixth fields of the transaction, and the fourth view 910D corresponds to the first, second, fifth, and sixth fields of the transaction. For simplicity, this example assumes that a given transaction 910 stored in second database 130 contains a set of ten fields. However, this disclosure contemplates that a transaction stored in second database 130 may contain any number of fields.

In certain embodiments, when channel view analyzer 180 receives a query 820 from a given channel, channel view analyzer determines the view assigned to the channel, by locating the channel in the channel views list 905. Channel view analyzer then determines the fields of the transaction associated with the given view, by locating the view in view registry 910. For example, if channel view analyzer 180 receives a query 820 from third channel 115C, channel view analyzer will use channel view list to determine that the fourth view is assigned to third channel 115C and will further user view registry 910 to determine that the fourth view 910D consists of the first, second, fifth, and sixth fields of the transaction.

Once channel view analyzer has determined the view assigned to the given channel, channel view analyzer implements database reader 915 to access second database 130, to read those fields of the set of fields 920 assigned to the view, and to send the fields to user device 115, as response 825. In certain embodiments, each view of the set of views stored in view registry 910 includes a hash value that channel view analyzer 180 uses to retrieve those fields of the set of fields 920 assigned to a given view.

In certain embodiments, channel view analyzer 180 is configured to adapt as users 110 change their data access patterns. For example, in certain embodiments, after channel view analyzer 180 has determined a view assigned to a given channel and has sent a response 825 to the given channel, channel view analyzer 180 further determines whether a user 110 used the channel to access the full subset of fields associated with the view. If channel view analyzer 180 determines that user 110 did not access a subset of fields of the view, channel view analyzer 180 removes that subset of fields from the view and adds this new view, along with the channel to which the original view was provided, to training data 805. Channel view analyzer 180 then instructs machine learning trainer 810 to update machine learning policy 815 based on the updated training data 805.

As another example, in certain embodiments, after channel view analyzer 180 has determined a view assigned to a given channel and has sent a response 825 to the given channel, channel view analyzer 180 further determines whether a user 110 attempted to use the channel to access more fields than were present in the view. If channel view analyzer 180 determines that user 110 did attempt to use the channel to access more fields than were present in the view, channel view analyzer adds the additional fields to the view, and adds this new view, along with the channel to which the original view was provided, to training data 805. Channel view analyzer 180 then instructs machine learning trainer 810 to update machine learning policy 815 based on the updated training data 805.

Figure 10:
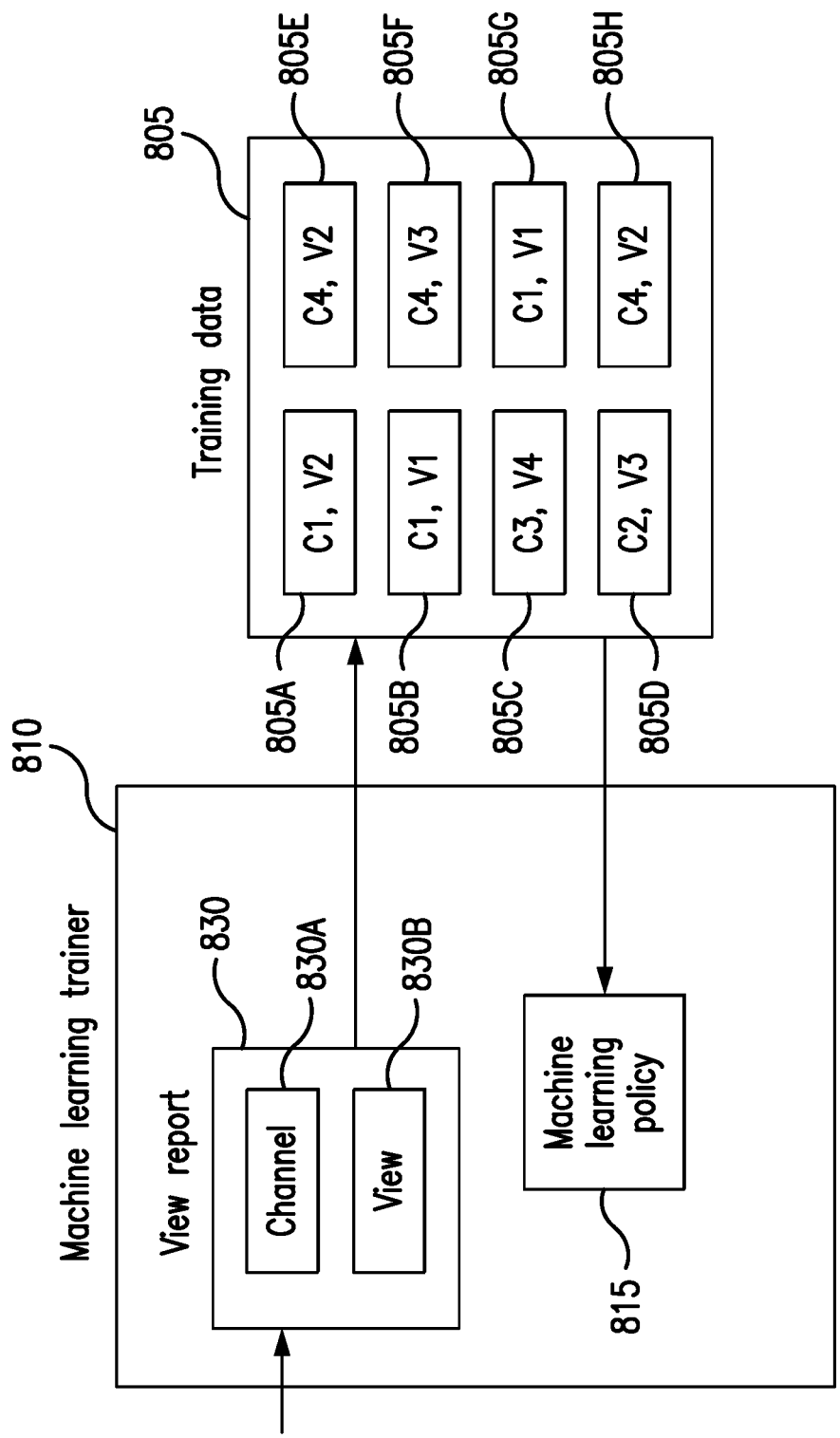
FIG. 10 illustrates the process by which the database tool of the system of FIG. 1 trains a machine learning policy to associate given access channels with transaction views.

FIG. 10 further illustrates the process by which machine learning trainer 810 trains machine learning policy 815. When database tool 105 receives a view report 830 from a user 110, this view report contains both the channel 830A on which user 110 viewed one or more of the set of fields associated with a given transaction, as well as an indication of the view 830B of the set of fields accessed by the user (i.e. an indication of those fields of the total set of fields that the user actually accessed). Channel view analyzer 180 stores view report 830 as a set of training data in the set of training data 805, stored in third memory 140. Training data 805 contains a number of such view reports, illustrated here as view reports 805A through 805H. Machine learning trainer 810 uses training data 805 to train machine learning policy 815 such that when provided with a particular transaction and channel, machine learning policy 815 can determine the transaction view associated with the channel. In certain embodiments, machine learning trainer 810 determines a transaction view for a given transaction and a given user channel, by determining that the probability that the given channel accesses the transaction view (consisting of a subset of fields of the set of fields associated with the transaction) is greater than a set percentage. In certain embodiments, machine learning trainer 810 uses a classification algorithm to train machine learning policy 815. In certain other embodiments, machine learning trainer 810 uses a logistic regression algorithm to train machine learning policy 815.

Figure 11:
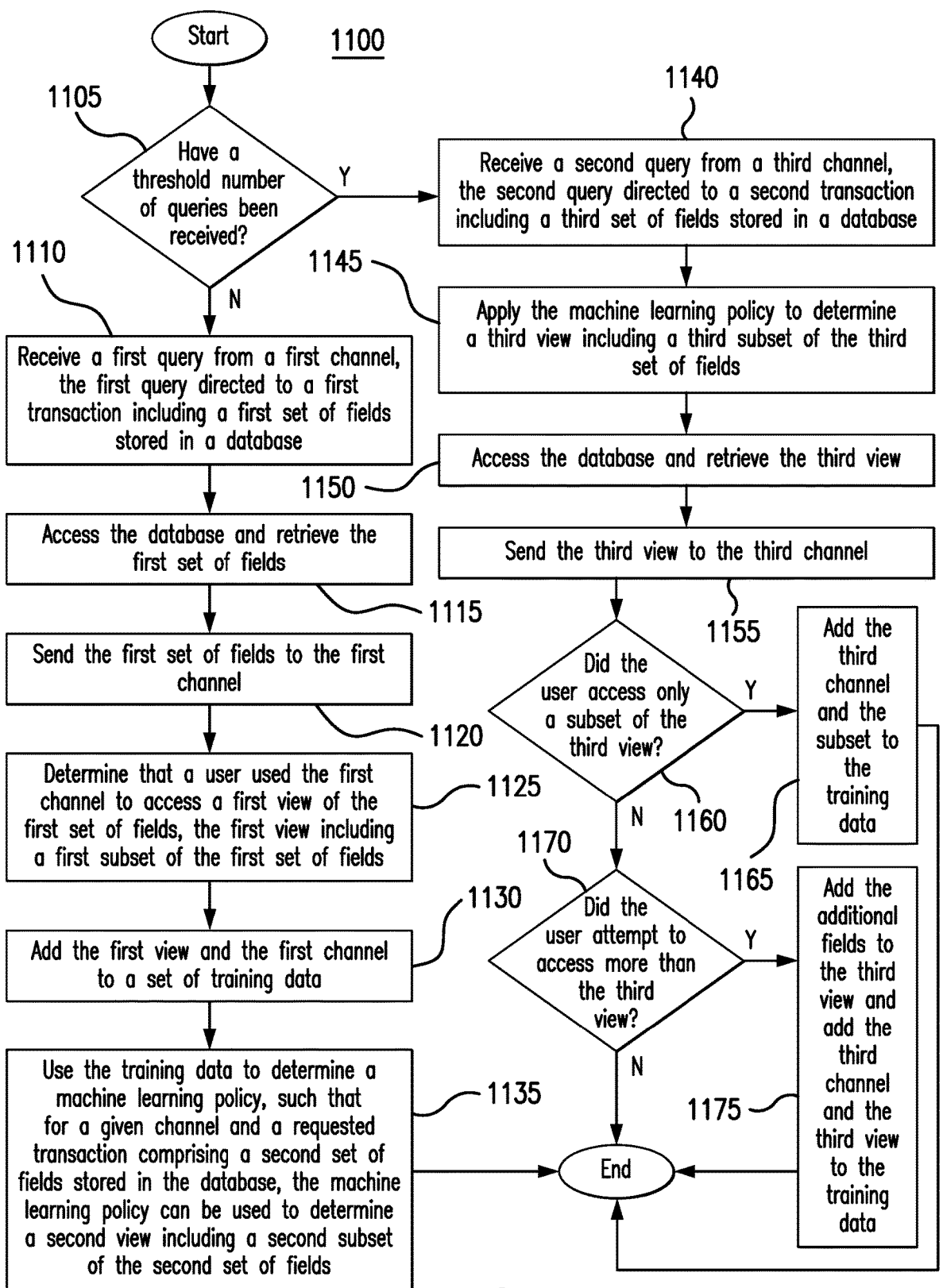
FIG. 11 presents a flowchart further illustrating the process by which the database tool of the system of FIG. 1 receives and responds to user queries.

FIG. 11 illustrates the process by which database tool 105 receives and responds to queries 820 from users 110. In step 1105, database tool 105 determines whether a threshold number of queries have been received. If database tool 105 determines that the threshold number of queries have not yet been received, then in step 1110 database tool 105 receives a first query 820 from a first channel. Here, the first query 820 is directed to a first transaction that includes a first set of fields and that is stored in second database 130. In step 1115, database tool 105 accesses second database 130 and retrieves the first set of fields. In step 1120, database tool 105 sends the first set of fields to the first channel. In step 1125, database tool 105 determines that a user 110 used the first channel to access a first view of the first set of fields, where the first view includes a first subset of the first set of fields. In step 1130, database tool 105 adds the first view and the first channel to a set of training data 805. In step 1135, database tool 105 uses the training data 805 to determine a machine learning policy 815, such that for a given channel and a requested transaction (which includes a second set of fields stored in second database 125), the machine learning policy 815 can be used to determine a second view that includes a second subset of the second set of fields.

If, in step 1105, database tool 105 determined that the threshold number of queries had been received by the tool, then in step 1140, database tool 105 receives a second query 820 from a third channel. Here, the second query is directed to a second transaction that includes a third set of fields stored in second database 130. In step 1145, database tool 105 applies the machine learning policy 815 to the third channel and the second transaction to determine a third view that includes a third subset of the third set of fields. In step 1150, database tool 105 accesses second database 130 and retrieves the third view. In step 1155, database tool 105 sends the third view to the third channel.

In step 1160, database tool 105 determines whether user 110 accessed only a subset of the third view rather than the entire third view. If database tool 105 determines that user 110 did, in fact, only access a subset of the third view in step 1160, then in step 1165 database tool 105 adds the third channel and the subset of the third view to the set of training data 805. If in step 1160, database tool 105 determines that user 110 did not only access a subset of the third view, then in step 1170, database tool 105 next determines whether user 110 attempted to access more fields than those that were presented in the third view. If database tool 105 determines that the user 110 did attempt to access more fields than were presented by the third view, then in step 1175, database tool 105 adds the additional fields to the third view and adds the third view and the third channel to the set training data 805 which is used to re-train the machine learning model 815.

Modifications, additions, or omissions may be made to method 1100 depicted in FIG. 11. Method 1100 may include more, fewer, or other steps. For example, steps may be performed in parallel or in any suitable order. While discussed as database tool 105 (or components thereof) performing the steps, any suitable component of system 100, such as device(s) 115 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. A system comprising:
   a database configured to store a plurality of transactions, each transaction of the plurality of transactions assigned to a transaction type of a set of transaction types and comprising a set of fields associated with the assigned transaction type;
   a memory configured to store training data comprising a set of types of user devices and a plurality of views, each view of the plurality of views assigned to a type of user device of the set of types of user devices and associated with a given transaction type of the set of transaction types, wherein:
the set of types of user devices comprises a mobile phone and a computer; and
each view identifies a subset of the set of fields associated with the given transaction type that were previously accessed by the assigned type of user device; and
a hardware processor communicatively coupled to the memory, the hardware processor configured to:
determine that a threshold number of queries have not been received; and
in response to determining that the threshold number of queries have not been received:
receive a first query from a first user device of a first type of user device of the set of types of user devices, the first query directed to a first transaction assigned to a first transaction type of the set of transaction types and comprising a first set of fields associated with the first transaction type and stored in the database;
access the database and retrieve the first set of fields;
send the first set of fields to the first user device;
determine that a user used the first user device to access a first subset of the first set of fields;
add a first view to the training data, the first view assigned to the first type of user device and identifying the first subset of the first set of fields associated with the first transaction type that was accessed by the first type of user device;
use the training data to determine a machine learning policy, such that for a second type of user device of the set of types of user devices and a second transaction assigned to a second transaction type of the set of transaction types and comprising a second set of fields associated with the second transaction type and stored in the database, the machine learning policy can be used to determine a second view assigned to the second type of user device and identifying a second subset of the second set of fields, wherein determining the second view comprises determining that a confidence level that the second type of user device will access the second subset of the second set of fields identified by the second view is greater than a given threshold;
determine that the threshold number of queries has been received;
in response to determining that the threshold number of queries has been received:
receive a second query from a second user device of the second type of user device, the second query directed to second the second transaction assigned to the second transaction type and comprising the second set of fields associated with the second transaction type and stored in the database;
apply the machine learning policy to determine the second view assigned to the second type of user device and identifying the second subset of the second set of fields;
access the database and retrieve the second subset of the second set of fields; and
in response to retrieving the second subset, send the second subset to the second user device.

2. The system of claim 1, wherein the processor is further configured to:
in response to sending the second subset to the second user device:
determine that the second user device did not access a third subset of the second subset of the second set of fields;
remove the third subset from the second subset;
add a third view to the training data, the third view identifying the second subset; and
update the machine learning policy based in part on the third view.

3. The system of claim 1, wherein the processor is further configured to:
in response to sending the second subset to the second user device:
determine that the second user device attempted to access an additional field of the second set of fields not present in the second subset of the second set of fields;
add the additional field to the second subset;
add a third view to the training data, the third view identifying the second subset; and
update the machine learning policy based in part on the third view.

4. The system of claim 1, wherein the first user device comprises a tablet and the second user device comprises a mobile phone.

5. The system of claim 1, wherein the database is an unnormalized database.

6. The system of claim 1, wherein determining the machine learning policy comprises determining a set of views, each view of the set of views assigned to one or more types of user devices of the set of types of user devices.

7. The system of claim 6, wherein each view of the set of views comprises a hash value used to retrieve a subset of a set of fields comprising a transaction, stored in the database.

8. A method comprising:
determining that a threshold number of queries have not been received;
in response to determining that the threshold number of queries have not been received:
receiving a first query from a first user device of a first type of user device of a set of types of user devices, the first query directed to a first transaction assigned to a first transaction type of a set of transaction types and comprising a first set of fields associated with the first transaction type and stored in a database, wherein the set of types of user devices comprises a mobile phone and a computer;
accessing the database and retrieving the first set of fields;
sending the first set of fields to the first user device;
determining that a user used the first user device to access a first subset of the first set of fields;
adding a first view to training data, the first view assigned to the first type of user device and identifying the first subset of the first set of fields associated with the first transaction type that was accessed by the first type of user device;
using the training data to determine a machine learning policy, such that for a second type of user device of the set of types of user devices and a second transaction assigned to a second transaction type of the set of transaction types and comprising a second set of fields associated with the second transaction type and stored in the database, the machine learning policy can be used to determine a second view assigned to the second type of user device and identifying a second subset of the second set of fields, wherein determining the second view comprises determining that a confidence level that the second type of user device will access the second subset of the second set of fields identified by the second view is greater than a given threshold;
determining that the threshold number of queries has been received; and
in response to determining that the threshold number of queries has been received:
receiving a second query from a second user device of the second type of user device, the second query directed to the second transaction assigned to the second transaction type and comprising third the second set of fields associated with the second transaction type and stored in the database;
applying the machine learning policy to determine the second view assigned to the second type of user device and identifying the second subset of the second set of fields;
accessing the database and retrieve the second subset of the second set of fields; and
in response to accessing the database and retrieving the second subset, sending the second subset to the second user device.

9. The method of claim 8, further comprising:
in response to sending the second subset to the second user device:
determining that the second user device did not access a third subset of the second subset of the second set of fields;
removing the third subset from the second subset;
adding a third view to the training data, the third view identifying the second subset; and
updating the machine learning policy based in part on the third view.

10. The method of claim 8, further comprising:
in response to sending the second subset to the second user device:
determining that the second user device attempted to access an additional field of the second set of fields not present in the second subset of the second set of fields;
adding the additional field to the second subset;
adding a third view to the training data, the third view identifying the second subset; and
updating the machine learning policy based in part on the third view.

11. The method of claim 8, wherein the first user device comprises a tablet and the second user device comprises a mobile phone.

12. The method of claim 8, wherein the database is an unnormalized database.

13. The method of claim 8, wherein determining the machine learning policy comprises determining a set of views, each view of the set of views assigned to one or more types of user devices of the set of types of user devices.

14. The method of claim 13, wherein each view of the set of views comprises a hash value used to retrieve a subset of a set of fields comprising a transaction, stored in the database.

15. A system comprising:
a first storage element operable to store a plurality of transactions, each transaction of the plurality of transactions assigned to a transaction type of a set of transaction types and comprising a set of fields associated with the assigned transaction type;
a second storage element operable to store training data comprising a set of types of user devices and a plurality of views, each view of the plurality of views assigned to a type of user device of the set of types of user devices and associated with a given transaction type of the set of transaction types, wherein:
the set of types of user devices comprises a mobile phone, a tablet, and a computer; and
each view identifies a subset of the set of fields associated with the given transaction type that were previously accessed by the assigned type of user device; and
a processing element communicatively coupled to the second storage element, the processing element operable to:
determine that a threshold number of queries have not been received; and
in response to determining that the threshold number of queries have not been received:
receive a first query from a first user device of a first type of user device of the set of types of user devices, the first query directed to a first transaction assigned to a first transaction type of the set of transaction types and comprising a first set of fields associated with the first transaction type and stored in the first storage element, the first user device used to access the first storage element;
access the first storage element and retrieve the first set of fields;
send the first set of fields to the first user device;
determine that a user used the first user device to access a first subset of the first set of fields;
add a first view to the training data, the first view assigned to the first type of user device and identifying the first subset of the first set of fields associated with the first transaction type that was accessed by the first type of user device;
use the training data to determine a machine learning policy, such that for a second type of user device of the set of types of user devices and a second transaction assigned to a second transaction type of the set of transaction types and comprising a second set of fields associated with the second transaction type and stored in the first storage element, the machine learning policy can be used to determine a second view assigned to the second type of user device and identifying a second subset of the second set of fields, wherein determining the second view comprises determining that a confidence level that the second type of user device will access the second subset of the second set of fields identified by the second view is greater than a given threshold;
determine that the threshold number of queries has been received;
in response to determining that the threshold number of queries has been received:
receive a second query from a second user device of the second type of user device, the second query directed to the second transaction assigned to the second transaction type and comprising the second set of fields associated with the second transaction type and stored in the first storage element, the second type of user device comprising the mobile phone;

apply the machine learning policy to determine the second view assigned to the second type of user device and identifying the second subset of the second set of fields;

access the first storage element and retrieve the second subset of the second set of fields; and in response to accessing the first storage element and retrieving the second subset, send the second subset to the second user device.

16. The system of claim 15, wherein the processing element is further operable to:

in response to sending the second subset to the second user device:

determine that the second user device did not access a third subset of the second subset of the second set of fields;

remove the third subset from the second subset;

add a third view to the training data, the third view identifying the second subset; and update the machine learning policy based in part on the third view.

17. The system of claim 15, wherein the processing element is further operable to:

in response to sending the second subset to the second user device:

determine that the second user device attempted to access an additional field of the second set of fields not present in the second subset of the second set of fields;

add the additional field to the second subset;

add a third view to the training data, the third view identifying the second subset; and update the machine learning policy based in part on the third view.

18. The system of claim 15, wherein the first storage element is an unnormalized database.

19. The system of claim 15, wherein determining the machine learning policy comprises determining a set of views, each view of the set of views assigned to one or more types of user devices of the set of types of user devices.

20. The system of claim 19, wherein each view of the set of views comprises a hash value used to retrieve a subset of a set of fields comprising a transaction, stored in the first storage element.

* * * * *